United States Patent
Cornick et al.

(10) Patent No.: US 11,232,183 B2
(45) Date of Patent: *Jan. 25, 2022

(54) BIOMETRIC TICKETING

(71) Applicant: Alclear, LLC, New York, NY (US)

(72) Inventors: Kenneth Cornick, New York, NY (US); Kevin Lupowitz, New York, NY (US); Matthew Snyder, New York, NY (US); Joe Trelin, New York, NY (US)

(73) Assignee: ALCLEAR, LLC, Cupertino, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/731,472

(22) Filed: Dec. 31, 2019

(65) Prior Publication Data

US 2020/0134154 A1 Apr. 30, 2020

Related U.S. Application Data

(63) Continuation of application No. 16/272,611, filed on Feb. 11, 2019, now Pat. No. 10,552,597, which is a
(Continued)

(51) Int. Cl.
*G06F 21/32* (2013.01)
*G07C 9/00* (2020.01)
*G07B 15/00* (2011.01)
*G07C 9/37* (2020.01)
(Continued)

(52) U.S. Cl.
CPC ............ *G06F 21/32* (2013.01); *G06Q 50/30* (2013.01); *G07B 15/00* (2013.01); *G07C 9/26* (2020.01);
(Continued)

(58) Field of Classification Search
CPC .. G06F 21/32; G07C 9/38; G07C 9/26; G07C 9/37; G07C 9/28
See application file for complete search history.

(56) References Cited

U.S. PATENT DOCUMENTS 7,598,857 B1 * 10/2009 Reagan ................. G08B 25/00
340/539.13
7,705,731 B2 4/2010 Trammell
(Continued)

FOREIGN PATENT DOCUMENTS

CN 101226653 7/2008
EP 2883218 6/2015
(Continued)

OTHER PUBLICATIONS

"Biometric-based, seamless airport processing to be trialled at Aruba Airport," Future Travel Experience, http://www.futuretravelexperience.com/2014/05, May 2014.
(Continued)

*Primary Examiner* — Santiago Garcia
(74) *Attorney, Agent, or Firm* — Brownstein Hyatt Farber Schreck, LLP

(57) ABSTRACT

In biometric ticketing, physical token-less ticketing system using biometrics, a person may be identified using a digital representation of a biometric. Ticketing information may be ascertained based on the identification. The ticketing information may be provided, actions may be performed using the ticketing information, and so on. In some implementations, a checkpoint device receives biometric data from a person. A digital representation of the biometric data is used to obtain an identifier from an identification system. The digital representation of the biometric data may not be included in the identifier. The identifier is used by to obtain ticketing information from a ticketing system. The person may be allowed or denied entry into a ticketed area based on the ticketing information.

20 Claims, 17 Drawing Sheets

Related U.S. Application Data continuation of application No. 16/132,037, filed on Sep. 14, 2018, now Pat. No. 10,275,587, which is a continuation of application No. 15/989,883, filed on May 25, 2018, now Pat. No. 10,268,813, which is a continuation of application No. 15/958,734, filed on Apr. 20, 2018, now Pat. No. 10,268,812, which is a continuation of application No. 15/717,416, filed on Sep. 27, 2017, now Pat. No. 10,049,201, which is a continuation of application No. 15/618,659, filed on Jun. 9, 2017, now Pat. No. 9,870,459, which is a continuation of application No. 15/154,823, filed on May 13, 2016, now Pat. No. 9,721,081.

(60) Provisional application No. 62/690,242, filed on Jun. 26, 2018, provisional application No. 62/559,371, filed on Sep. 15, 2017, provisional application No. 62/161,330, filed on May 14, 2015.

(51) Int. Cl.
*G07C 9/38* (2020.01)
*G07C 9/26* (2020.01)
*G07C 9/28* (2020.01)
*G06Q 50/30* (2012.01)

(52) U.S. Cl.
CPC ............. *G07C 9/28* (2020.01); *G07C 9/37* (2020.01); *G07C 9/38* (2020.01); *G07C 2209/02* (2013.01)

(56) References Cited

U.S. PATENT DOCUMENTS

| | | | |
|---|---|---|---|
| 7,744,033 B2 | 6/2010 | Linero | |
| 8,279,067 B2 | 10/2012 | Berger | |
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,744,966 B1 | 6/2014 | Amacker et al. | |
| 8,892,697 B2 | 11/2014 | Nema | |
| 8,965,170 B1 | 2/2015 | Benea | |
| 9,003,196 B2 | 4/2015 | Hoyos | |
| 9,087,204 B2 | 7/2015 | Gormley | |
| 9,107,064 B1 | 8/2015 | Ramalingam et al. | |
| 9,117,066 B2 | 8/2015 | Nathan | |
| 9,159,059 B2 | 10/2015 | Daddabbo | |
| 9,166,961 B1 | 10/2015 | Johansson et al. | |
| 9,202,105 B1 | 12/2015 | Wang et al. | |
| 9,245,175 B1* | 1/2016 | Vladimir | G06F 21/32 |
| 9,324,098 B1 | 4/2016 | Agrawal et al. | |
| 9,386,507 B1 | 7/2016 | Ramalingam et al. | |
| 9,460,572 B2* | 10/2016 | Cheikh | G07C 9/00031 |
| 9,481,197 B2 | 11/2016 | Eckel | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,721,078 B2 | 8/2017 | Cornick | |
| 9,721,081 B2 | 8/2017 | Cornick et al. | |
| 9,723,131 B1 | 8/2017 | Ramalingam et al. | |
| 9,836,642 B1 | 12/2017 | Ramaswamy | |
| 9,870,459 B2* | 1/2018 | Cornick | G06F 21/32 |
| 9,934,504 B2 | 4/2018 | Wang et al. | |
| 9,947,155 B2 | 4/2018 | Trani | |
| 9,967,250 B2 | 5/2018 | Johansson et al. | |
| 10,027,662 B1 | 7/2018 | Mutagi et al. | |
| 10,004,201 B1 | 8/2018 | Cornick et al. | |
| 10,042,994 B2 | 8/2018 | Perna | |
| 10,049,201 B2* | 8/2018 | Cornick | G06F 21/32 |
| 10,055,740 B2 | 8/2018 | Hanson et al. | |
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,161,782 B2 | 12/2018 | Saltgiver et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 10,268,812 B2* | 4/2019 | Cornick | G07C 9/38 |
| 10,268,813 B2* | 4/2019 | Cornick | G06F 21/32 |
| 10,275,587 B2* | 4/2019 | Cornick | G07C 9/26 |
| 10,489,573 B2* | 11/2019 | Cornick | G07C 9/37 |
| 10,528,716 B2* | 1/2020 | Cornick | G07C 9/28 |
| 10,552,597 B2* | 2/2020 | Cornick | G07C 9/37 |
| 11,151,481 B1 | 10/2021 | Sun et al. | |
| 2001/0000535 A1 | 4/2001 | Lapsley et al. | |
| 2003/0128099 A1* | 7/2003 | Cockerham | G07B 15/00 340/5.7 |
| 2004/0078335 A1 | 4/2004 | Calvesio | |
| 2004/0133804 A1* | 7/2004 | Smith | G06Q 10/10 713/186 |
| 2004/0190757 A1* | 9/2004 | Murphy | G07B 15/00 382/115 |
| 2004/0221303 A1 | 11/2004 | Sie | |
| 2004/0236701 A1* | 11/2004 | Beenau | G06Q 20/32 705/64 |
| 2007/0205272 A1* | 9/2007 | Daddabbo | G06Q 20/18 235/382 |
| 2007/0284481 A1* | 12/2007 | Linero | B64D 9/00 244/137.1 |
| 2009/0045257 A1* | 2/2009 | Maus | G06K 19/025 235/382 |
| 2009/0189736 A1* | 7/2009 | Hayashi | G06F 21/32 340/5.81 |
| 2009/0322510 A1* | 12/2009 | Berger | G06Q 10/08 340/539.1 |
| 2011/0213709 A1* | 9/2011 | Newman | G06F 21/32 705/44 |
| 2013/0305059 A1* | 11/2013 | Gormley | G07F 7/08 713/189 |
| 2013/0307670 A1* | 11/2013 | Ramaci | H04L 63/0861 340/5.82 |
| 2014/0032723 A1* | 1/2014 | Nema | G06Q 10/00 709/220 |
| 2014/0189720 A1 | 7/2014 | Terrazas | |
| 2014/0198958 A1* | 7/2014 | Nathan | G06F 21/32 382/116 |
| 2014/0289842 A1* | 9/2014 | Cornick | G06F 21/32 726/19 |
| 2014/0316562 A1 | 10/2014 | Leitmann et al. | |
| 2014/0337930 A1* | 11/2014 | Hoyos | H04L 63/10 726/4 |
| 2014/0363057 A1* | 12/2014 | Eckel | G06F 21/32 382/116 |
| 2015/0294515 A1 | 10/2015 | Bergdale | |
| 2016/0012218 A1* | 1/2016 | Perna | G06F 16/5838 726/18 |
| 2016/0025545 A1* | 1/2016 | Saltzgiver | G01F 23/263 73/304 C |
| 2016/0189063 A1 | 6/2016 | Nie | |
| 2016/0227897 A1 | 8/2016 | Jobling et al. | |
| 2016/0277616 A1 | 9/2016 | Leitmann et al. | |
| 2016/0281412 A1 | 9/2016 | Leitmann et al. | |
| 2016/0343187 A1* | 11/2016 | Trani | G07C 9/00119 |
| 2017/0188103 A1 | 6/2017 | Pan | |
| 2018/0007060 A1 | 1/2018 | Leblang et al. | |
| 2018/0247041 A1 | 8/2018 | Cornick et al. | |
| 2018/0276360 A1 | 9/2018 | Cornick et al. | |
| 2019/0012451 A1 | 1/2019 | Cornick et al. | |
| 2019/0036939 A1 | 1/2019 | Johansson et al. | |
| 2019/0050631 A1 | 2/2019 | Hayase | |
| 2019/0089790 A1 | 3/2019 | Bathiche et al. | |
| 2019/0102997 A1* | 4/2019 | Kelly | G07F 17/3223 |

FOREIGN PATENT DOCUMENTS

| | | |
|---|---|---|
| EP | 2941863 | 11/2015 |
| WO | WO01/09796 | 2/2001 |
| WO | WO01/37169 | 5/2001 |
| WO | WO01/93167 | 12/2001 |

(56) References Cited

FOREIGN PATENT DOCUMENTS

| | | |
|---|---|---|
| WO | WO03/069447 | 8/2003 |
| WO | WO2012/052808 | 4/2012 |
| WO | WO2013/043069 | 3/2013 |
| WO | WO2013/132273 | 9/2013 |
| WO | WO2014/077716 | 5/2014 |
| WO | WO2015/036738 | 3/2015 |
| WO | WO2015/076686 | 5/2015 |
| WO | WO2015/145139 | 10/2015 |
| WO | WO2015/145142 | 10/2015 |

OTHER PUBLICATIONS

"Biometric technology-the key enabler of a single passenger token and improved passenger tracking?" Future Travel Experience, http://www.futuretravelexperience.com/2014/08, Aug. 2014.
International Search Report and Written Opinion, PCT/US2016/032532, filed May 13, 2016, 12 pages.

* cited by examiner

BIOMETRIC TICKETING

CROSS-REFERENCE TO RELATED APPLICATIONS

This application is a continuation patent application of U.S. patent application Ser. No. 16/272,611, filed Feb. 11, 2019 and titled "Biometric Ticketing," which is a continuation patent application of U.S. patent application Ser. No. 16/132,037, filed Sep. 14, 2018 and titled "Biometric Ticketing," now U.S. Pat. No. 10,275,587, which is a nonprovisional patent application of and claims the benefit of U.S. Provisional Patent Application No. 62/559,371, filed Sep. 15, 2017, and titled "Physical Token-Less Ticketing Using Biometrics" and U.S. Provisional Patent Application No. 62/690,242, filed Jun. 26, 2018, and titled "Biometric Ticketing." U.S. patent application Ser. No. 16/132,037 is also a continuation-in-part of U.S. patent application Ser. No. 15/989,883, filed May 25, 2018 and titled "Physical Token-Less Security Screening Using Biometrics," now U.S. Pat. No. 10,268,813, which is a continuation patent application of U.S. patent application Ser. No. 15/958,734, filed Apr. 20, 2018 and titled "Physical Token-Less Security Screening Using Biometrics," now U.S. Pat. No. 10,268,812, which is a continuation patent application of U.S. patent application Ser. No. 15/717,416, filed Sep. 27, 2017 and titled "Physical Token-Less Security Screening Using Biometrics," now U.S. Pat. No. 10,049,201, which is a continuation patent application of U.S. patent application Ser. No. 15/618,659, filed Jun. 9, 2017 and titled "Physical Token-Less Security Screening Using Biometrics," now U.S. Pat. No. 9,870,459, which is a continuation patent application of U.S. patent application Ser. No. 15/154,823, filed May 13, 2016 and titled "Physical Token-Less Security Screening Using Biometrics," now U.S. Pat. No. 9,721,081, which is a nonprovisional patent application of and claims the benefit of U.S. Provisional Patent Application No. 62/161,330, filed May 14, 2015 and titled "Biometric Obtained Electronic Board Pass," the disclosures of which are hereby incorporated herein by reference in their entireties.

TECHNICAL FIELD

This disclosure relates generally to ticketing, and more specifically to biometric ticketing or ticketing using biometrics without obtaining physical tokens.

BACKGROUND

There are a variety of different situations in which service or other providers issue tickets or similar tokens to customers, which may be physical tokens or electronic tokens presented via physical electronic devices such as smart phones. In many situations, the tokens may be presented at a checkpoint in order to enter a venue or other ticketed area.

For example, people may be able to obtain tickets for a sporting event. Ticket checkpoints may be set up at a venue for the sporting event in order to ensure that only ticketed people are allowed entry. For example, ticket checkpoints may be set up at entrances of the venue for the sporting event. People may present physical or electronic tickets at the ticket checkpoints in order to validate that they are entitled to entry. Upon validation of such a physical or electronic ticket, the person may be allowed entry into the venue for the sporting event.

SUMMARY

The present disclosure relates to systems, methods, apparatuses, and computer program products for biometric ticketing, or physical token-less ticketing using biometrics. In some implementations, a person may be identified using a digital representation of a biometric. Ticketing information may be ascertained based on the identification. The ticketing information may be provided, actions may be performed using the ticketing information, and so on.

In various implementations, a person may provide biometric data to a checkpoint device as part of a ticketing system. A digital representation of the biometric data may be used to look up an identifier for the person from an identification system device. The digital representation of the biometric data may not be included in the identifier. The identifier may be used to obtain ticketing information from a ticketing system, which may be used to determine whether or not to allow the person entry into a ticketed area.

In various embodiments, a checkpoint system includes at least one non-transitory storage medium storing instructions, at least one communication component communicably connected to a ticketing system device, and at least one processing unit coupled to the at least one non-transitory storage medium and the at least one communication component. The at least one processing unit executes the instructions to obtain a digital representation of biometric data for a person; ascertain an identifier for the person based on the digital representation of the biometric data, wherein the digital representation of the biometric data is not included in the identifier; receive ticketing information for the person based at least on the identifier; and approve the person based on the ticketing information. In numerous examples, the ticketing information corresponds to a sporting event, a flight, a vehicle rental, a lodging rental, a concert, a performance, or a movie.

In some examples, the at least one processing unit ascertains the identifier by transmitting the digital representation of the biometric data to an identification system device. In numerous examples, the at least one processing unit receives the identifier from the identification system device. In various examples, the at least one processing unit receives the ticketing information from the ticketing system device. In some implementations of such examples, the at least one processing unit receives the ticketing information in response to the identifier being provided to the ticketing system device.

In various examples, the at least one processing unit is at least a first processing unit of a first computing device and a second processing unit of a second computing device. The second computing device is communicably coupled to the first computing device.

In some embodiments, a method of operating a checkpoint system includes ascertaining an identifier for a person, using at least one processing unit, based on a digital representation of biometric data for the person, receiving ticketing information for the person, using the at least one processing unit, based at least on the identifier, and determining whether to approve the person, using the at least one processing unit, based on the ticketing information. The digital representation of the biometric data is not included in the identifier. In some implementations, the identifier is at least one of a name of the person, an email of the person, a phone number of the person, a ticketing system account number for the person, a state identification number for the person, or a social security number for the person.

In various examples, determining whether to approve the person includes determining whether the ticketing information indicates the person is entitled to approval. In some examples, determining whether to approve the person includes determining whether the person is on a security list.

In numerous examples, determining whether to approve the person includes determining whether to perform security screening on the person. In various examples, determining whether to approve the person includes determining whether to perform heightened security screening on the person. In some examples, determining whether to approve the person includes determining an entitlement level for the person based on the ticketing information.

In various embodiments, a computing device includes at least one non-transitory storage medium storing instructions, at least one communication component communicably connected to an identification system device and a ticketing system device, and at least one processing unit coupled to the at least one non-transitory storage medium and the at least one communication component. The at least one processing unit executes the instructions to obtain a digital representation of biometric data for a person; ascertain an identifier for the person by communicating with the identification system device using the digital representation of the biometric data, wherein the digital representation of the biometric data is not included in the identifier; obtain ticketing information for the person by communicating with the ticketing system device using the identifier; and presenting the ticketing information.

In some examples, the ticketing information corresponds to multiple tickets. In such examples, the at least one processing unit may be operable to select among the multiple tickets. In various examples, the ticketing system device includes a first ticketing system device operated by a first ticketing issuer and a second ticketing system device operated by a second ticketing issuer. In numerous examples, the at least one processing unit determines whether the person has previously used the ticketing information.

In various examples, the ticketing information indicates the person is to be denied entry. In some examples, the biometric data includes at least one of a facial image, a fingerprint, a retina image, an iris image, a gait, or a palm print.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, apparatuses, methods, and computer program products that embody various elements of the present disclosure. However, it should be understood that the described disclosure may be practiced in a variety of forms in addition to those described herein.

Having people present physical tokens (such as paper tickets for a baseball game or entry into another ticketed area) or physical evidence of such tokens (such as electronic tokens presented via an electronic device such as a smart phone) may be burdensome for both the people and the security screening process. A person may be burdened by obtaining such a physical token and having it in hand when proceeding through a ticketing checkpoint. Ticketing may be burdened by having to ensure that an appropriate physical ticket is provided.

Further, tokens such as tickets are often printed documents and/or electronic representations thereof. As typical ticketing systems may be unaware of the actual source of such printed documents or electronic representations, ticketing systems may be unable to detect forgeries. Additionally, even when the tokens were authorized at the time they were issued to a person, ticketing systems may have no way of ascertaining whether or not they have subsequently been cancelled or otherwise modified.

The present disclosure relates to systems, methods, apparatuses, and computer program products for biometric ticketing, or physical token-less ticketing using biometrics. In some implementations, a person may be identified using a digital representation of a biometric. Ticketing information may be ascertained based on the identification. The ticketing information may be provided, actions may be performed using the ticketing information, and so on.

In various implementations, a person may provide biometric data to a checkpoint device as part of a ticketing system. A digital representation of the biometric data may be used to look up an identifier for the person from an identification system device. The digital representation of the biometric data may not be included in the identifier. The identifier may be used to obtain ticketing information from a ticketing system, which may be used to determine whether or not to allow the person entry into a ticketed area.

Figure 1:
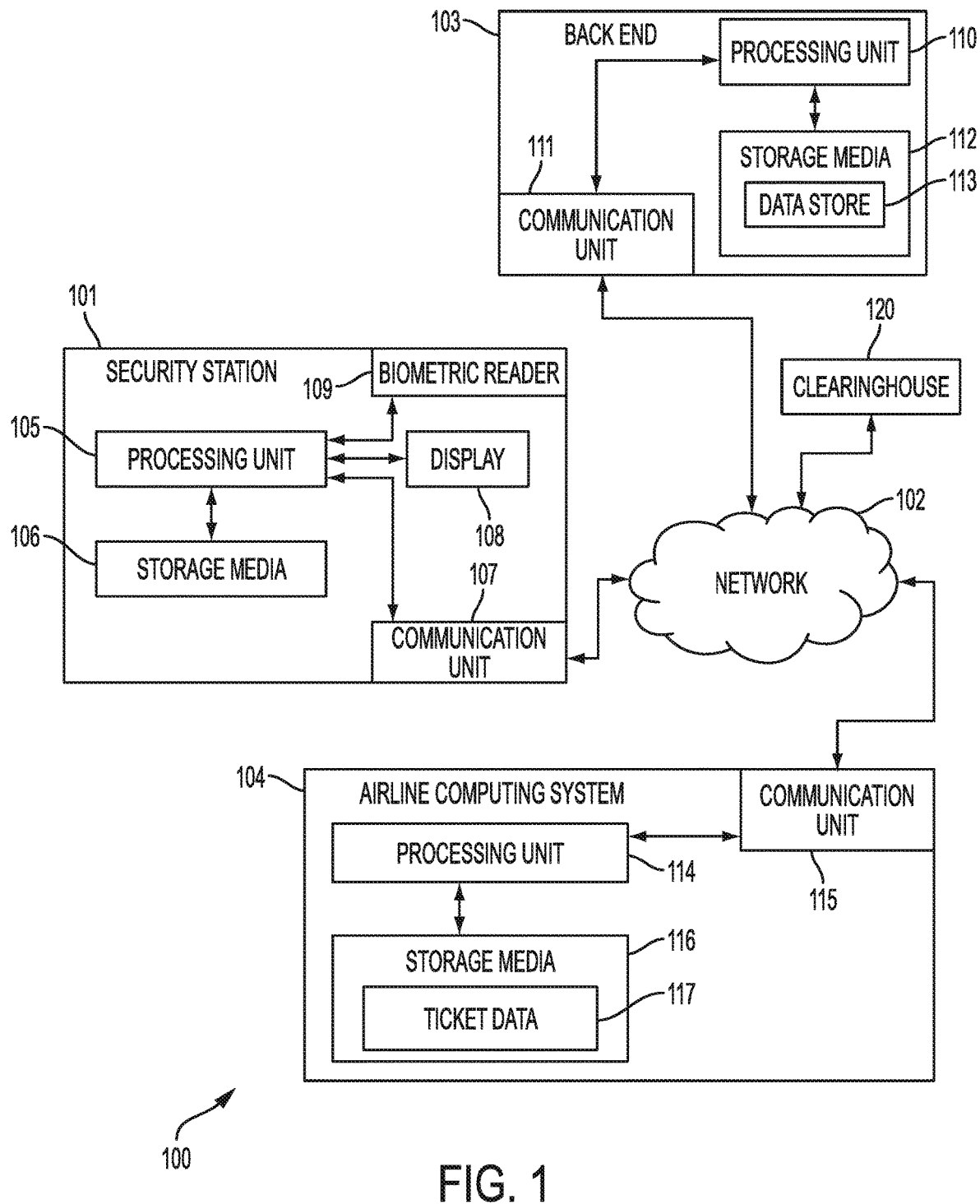
FIG. 1 is a block diagram illustrating a system for boarding pass-less airport security screening for flyers.

FIG. 1 is a block diagram illustrating a system 100 for boarding pass-less airport security screening for flyers. The system 100 may include a security station computing device 101 communicably coupled to a security back end 103 and an airline computing system 104 via one or more wired or wireless communication networks 102.

The security station computing device 101 may include one or more processing units 105, non-transitory storage media 106 (which may take the form of, but is not limited to, a magnetic storage medium; optical storage medium; magneto-optical storage medium; read only memory; random access memory; erasable programmable memory; flash memory; and so on), communication units 107, displays 108, and/or biometric readers 109 (such as one or more fingerprint or palm print scanners, retinal scanners, gait scanners, cameras, three-dimensional or "3D" sensors, and so on). Similarly, the security back end 103 and/or the airline computing system 104 may include one or more processing units 110 and 114, storage media 112 and 116, and/or communication units 111 and 115. Each of the security station computing device 101, the security back end 103, and/or the airline computing system 104 may be one or more of a variety of different computing devices such as a desktop computing device, a laptop computing device, a tablet computing device, a mobile computing device, a smart phone, multiple computing devices in a cloud or other computing system configuration, a server computing device, and so on.

The processing unit 105 of the security station computing device 101 may execute one or more instructions stored in the storage media 106 to perform one or more functions for the security station computing device 101. For example, the security station computing device 101 may obtain biometric data (such as an image or other electronic representation of a fingerprint, palm print, retina scan, facial scan, gait observation, and/or other biometric) from a person. The security station computing device 101 may transmit the biometric data to the security back end 103, which may use the biometric data to look up an identifier for the person (such as a frequent flyer identifier or other airline identifier) in a data store 113 stored in the storage media 112. In response, the security station computing device 101 may receive the identifier from the security back end 103. The security station computing device 101 may transmit the identifier to the airline computing system 104, which may look up electronic boarding pass information for the person based on the identifier in ticket data 117 stored in the storage media 116. In response, the security station computing device 101 may receive the electronic boarding pass information from the airline computing system 104.

In some implementations, the security station computing device 101 may cache information locally in the storage medium 106. For example, the security station computing device 101 may obtain and store information regarding identifiers, electronic boarding pass information, and/or other information related to all people who have flights on a particular day. In such an example, the security station computing device 101 may access such locally cached information when biometric data and/or an electronic representation thereof is received rather than communicated with the back end 103 and/or the airline computing system 104 at that time. This may improve the speed of operation as the security station computing device 101 may not have to wait for a response from the back end 103 and/or the airline computing system 104. Further, this may improve fault tolerance of the system 100 as the security station computing device 101 may still be able to function even if the security station computing device 101 loses the ability to communicate with the back end 103 and/or the airline computing system 104.

The security station computing device 101 may display the electronic boarding pass information on the display 108 as part of the security screening process, such as to clear the person and/or otherwise facilitate the security screening. For example, security screening personnel may check the displayed boarding pass information to verify that the person is authorized to enter the airport and then search the person and/or any belongings of the person to verify that the person meets one or more security screening criteria. In this way, the security screening may be performed without the person providing a boarding pass and/or identification other than the biometric.

This may simplify security screening for the security screening provider, the person, and/or the airline in a number of ways. For example, the person may be freed from having to obtain and/or produce a boarding pass and/or identification. By way of another example, the security screening provider may not have to train security personnel to evaluate the validity of various forms of identification (such as state issued identification, passports, and so on). Additionally a security screening provider may receive authorization to provide different levels of physical screening.

Additionally, as the electronic boarding pass information is obtained from the airline computing system 104, the electronic boarding pass information cannot be forged by the person or similar party. Since the electronic boarding pass information is obtained in real time, the electronic boarding pass information can include a current status of the electronic boarding pass information (such as whether or not a ticket associated with the electronic boarding pass was cancelled subsequent to purchase, current gate and/or delay information, and so on), which may be used to determine whether or not to clear the person for the security screening and/or to provide guidance or assistance to the person, for example to inform them of a recent gate change.

In some implementations, the security station computing device 101 may validate the electronic boarding pass information. For example, the security station computing device 101 may determine whether or not the electronic boarding pass information indicates the person has a ticket for a flight at an airport at which the security station computing device 101 operates and/or is otherwise associated within a particular time period (such as that calendar day, within twenty four hours, and so on). The security station computing device 101 may present such validation information (such as via the display 108) to facilitate the security screening process by security screening personnel.

In various implementations, the above described security screening process may be part of a prescreened security process. In such a prescreened security process, the person may enroll in or be selected for a program where the person's identity is authenticated and the person is determined to be less of a security risk than the general population such that the person is entitled to a lower security screening than the general population upon providing identification. Providing the biometric data to the security station computing device 101 may be that identification and proof of participation.

Although the present disclosure is illustrated and described within the context of security screening for airports, airlines, and electronic boarding pass information, it is understood that this is an example. In various implementations, techniques of the present disclosure may be used in any context where a security screening provider performs security screening for a service or other provider that issues any kind of ticket or other kind of token to customers without departing from the scope of the present disclosure.

For example, a person may be issued a badge for entering a particular area such as a garage by an operator of the area. The person may be screened for entry into the area by third party security. In such an example, the person may provide a biometric to a security computing device. The security computing device may use the biometric to look up an identifier for the person using a security back end. The security computing device may obtain access information from a virtual version of the badge using the identifier. The identifier may be associated with the operator of the area. The virtual version of the badge may be obtained from a computing device of the operator of the area. In this way, the third party security may be able to determine whether or not the person can be cleared to access the area without the person presenting the badge and/or identification other than the biometric, or what level of screening the person should experience.

However, it is understood that this is an example and other implementations are possible and contemplated. For example, in some implementations, the operator of the area may perform the screening instead of the third party security. In yet other implementations, the operator and the third party may cooperatively perform the screening.

The system 100 may include a clearinghouse 120 (a central database containing information related to individuals) communicably coupled to the security station computing device 101 via the communication network 102. The clearinghouse 120 (which may include components similar to the security station computing device 101, the security back end 103, and/or the airline computing system 104) may be operated by a government, a similarly associated agency, a private sector entity, and so on The clearinghouse 120 may store security screening status indicators associated with identifiers for various persons.

The security station computing device 101 may transmit the identifier for the person (which may be a security status identifier stored by and received from the security back end 103) to the clearinghouse 120 (whether directly or via the security back end 103) and receive a security screening status indicator in response. This security screening status indicator may be provided to personnel operating the security station computing device 101 to instruct the personnel regarding security protocols to use in clearing the person and/or otherwise utilized in clearing the person according to the security protocols.

For example, the clearinghouse 120 may be operated by a government agency as part of a prescreened security process. The clearinghouse 120 may store security screening status indicators for persons who have been prescreened and are thus eligible for a reduced security screening process. In such an example, the security station computing device 101 may transmit the identifier for the person to the clearinghouse 120 and receive back a security screening status indicator that indicates whether or not the person is eligible for the reduced screening process.

However, it is understood that this is an example and that the security screening status indicator may include other information. For example, in some implementations, the security screening status indicator may indicate that a person is a heightened security risk and should be screened using a heightened security process.

In various implementations, the system 100 may include both the clearinghouse 120 and the airline computing system 104 and the identifier may be utilized to obtain electronic boarding pass information from the airline computing system 104 and a security screening status indicator from the clearinghouse 120. However, in other implementations, the system 100 may include one of the clearinghouse 120 (to which one or more identifiers may be communicated to obtain the security screening status indicator) or the airline computing system 104 (to which one or more identifiers may be communicated to obtain the electronic boarding pass information). Various configurations are possible and contemplated.

Figure 2:
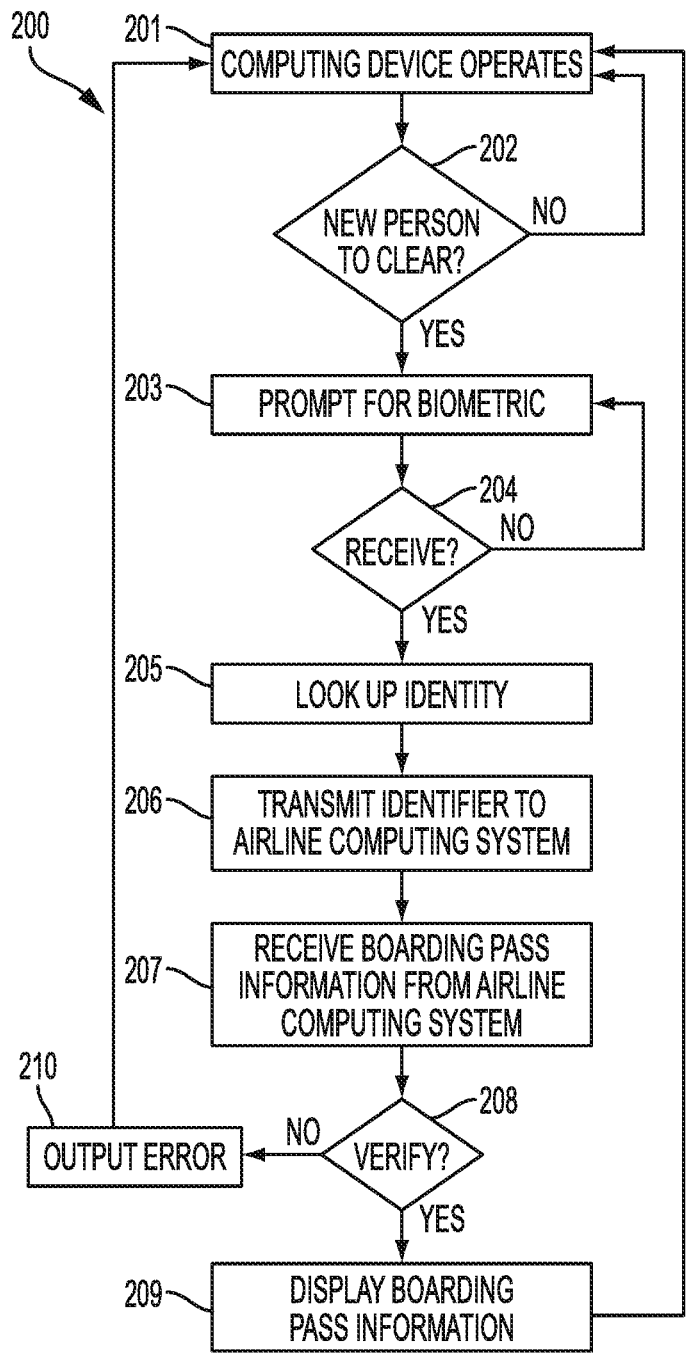
FIG. 2 is a flow chart illustrating a method for boarding pass-less airport security screening for flyers. This method may be performed by the system of FIG. 1.

FIG. 2 is a flow chart illustrating a method 200 for boarding pass-less airport security screening for flyers. This method 200 may be performed by the system 100 of FIG. 1.

At 201, a computing device may operate. At 202, the computing device may determine whether or not a new person is to be cleared as part of a security screening process. If not, the flow may return to 201 where the computing device continues to operate. Otherwise, the flow may proceed to 203.

At 203, after the computing device determines a new person is to be cleared, the computing device may prompt for the person to provide a biometric. The flow may then proceed to 204 where the computing device determines whether or not the requested biometric has been provided. If not, the flow may return to 203 where the computing device continues to prompt the person to provide the biometric. Otherwise, the flow may proceed to 205.

At 205, after the requested biometric is provided, the computing device may look up the identity of the person. The computing device may look up the identity of the person by transmitting the biometric to a back end and receiving an identifier such as a frequent flyer number or other airline identifier from the back end in response. The back end may match the biometric to a user account or other data store entry that identifies the person associated with the biometric along with other information. For example, the information may include name, address, phone number, driver's license or identification card number, passport number, one or more frequent flyer numbers, other airline identifiers, and/or other identifiers. The flow may then proceed to 206.

At 206, the computing device may transmit the identifier to an airline computing system. The airline computing system may use the identifier to look up real time boarding pass information and/or other real time information related to flights or other tickets associated with the identifier. The flow may then proceed to 207 where the computing device receives electronic boarding pass information from the airline computing system in response to transmitting the identifier.

Next, the flow may proceed to 208 where the computing device may verify the electronic boarding pass information. Such verification may include determining whether or not to clear the person for security screening. For example, said determining operation may include the computing device verifying that the electronic boarding pass information indicates that the person has a flight at the airport associated with the computing device, that the flight is that day or within a certain time period (such as twenty four hours), and so on. If the computing device successfully verifies the electronic boarding pass information, the flow proceeds to 209. Otherwise, if the computing device unsuccessfully attempts to verify the electronic boarding pass information, the flow proceeds to 210.

At 209, after the computing device successfully verifies the electronic boarding pass information, the computing device displays the electronic boarding pass information. This display of the electronic boarding pass information may be part of a security screening process, such as to clear the person and/or otherwise facilitate the security screening. The display may present any verifications that were performed as well as various information about the person and/or the electronic boarding pass information.

At 210, after the computing device unsuccessfully attempts to verify the electronic boarding pass information, the computing device may output an error message before the flow returns to 201 and the computing device continues to operate. Such an error may include errors that the person does not have a flight at the airport associated with the computing device, the person has been flagged (such as on a no flight or similar screening list), the person does not have a flight that day or within the certain time period, the person has no electronic boarding pass information, the person could not be identified, and/or any other such error.

Although the example method 200 is illustrated and described as including particular operations performed in a particular order, it is understood that this is an example. In various implementations, various orders of the same, similar, and/or different operations may be performed without departing from the scope of the present disclosure.

For example, although 205-207 are illustrated and described as looking up the identity of a person, transmitting an identifier to the airline computing system, and receiving electronic boarding pass information from the airline computing system, it is understood that this is an example. In various cases, one or more such operations may result in an error. For example, the identity of a person may not be able to be ascertained (such as where the biometric is not matched to anything in the back end) and an identifier may thus not be obtainable, the identity of a person may be ascertained but the back end may not store any identifiers, the airline computing system may not have any boarding pass information associated with the identifier, and so on. In such cases, the flow may proceed in the event of an error from any of 205-207 to 210 without proceeding through any of the other subsequent illustrated operations.

By way of another example, 203-204 is illustrated and described as prompting and receiving a single biometric. However, in various implementations, a system may first attempt to identify a person using a first type of biometric. If the person cannot be identified using the first type of biometric, the system may then divert the person and attempt to identify him using a second type of biometric. For example, the first type of biometric may be one where identification may be performed faster, less burdensomely, and so on (e.g., facial or gait recognition). Similarly, the second type of biometric may be one where identification may be performed slower, more burdensomely, and so on than the first type of biometric (e.g., fingerprint or iris scan). In this way, the system may attempt to minimize time and effort for biometric identification by using the first type of biometric whenever possible and resorting to the second type of biometric when identification using the first type of biometric is not successful.

Figure 3:
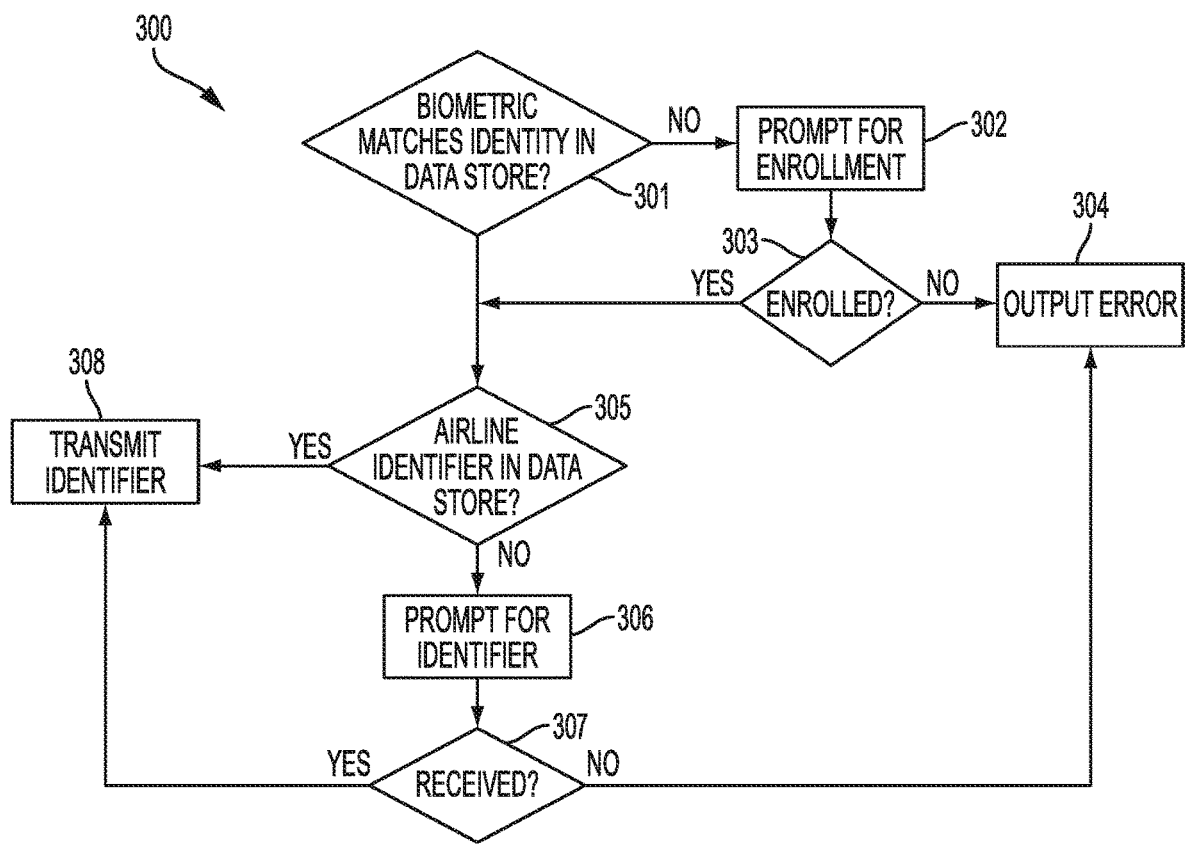
FIG. 3 is a flow chart illustrating an example of additional operations that may be performed as part of the method of FIG. 2 in some implementations.

Additionally, in some implementations, one or more additional operations may be performed. For example, FIG. 3 is a flow chart illustrating an example of additional operations 300 that may be performed as part of looking up the identity of the person 205 of the method 200 of FIG. 2.

At 301, the computing device determines whether or not the biometric matches an identity or other entry in the data store of the back end. This may be determined by the computing device communicating with the back end. If so, the flow may proceed to 305. Otherwise, the flow may proceed to 302.

At 302, after the computing device determines the biometric does not match an identity or other entry in the data store of the back end, the computing device may prompt for enrollment. This may be because the lack of a match between the biometric and an identity in the data store of the back end may mean that the person has not enrolled in the system for boarding pass-less airport security screening with which the computing device is associated. As such, the person may be prompted to enroll. Such enrollment may involve the participation of security personnel at the computing device to authenticate the identity of the user, such as where such security personnel verify a physical form of identification such as a state issued driver's license or identification card.

The flow may then proceed to 303 where the computing device may determine whether or not the person has enrolled. If so, the flow may proceed to 305. Otherwise, the flow may proceed to 304 where the computing device may output an error that the person is not enrolled.

At 305, after the computing device determines the biometric matches an identity or other entry in the data store of the back end, the computing device may determine whether or not an airline or other identifier is stored in the data store of the back end. This may also be determined by the computing device communicating with the back end. If so, the flow may proceed to 308 where the computing device may transmit the airline or other identifier to the airline computing system. Otherwise, the flow may proceed to 306.

At 306, the computing device may prompt the person to provide the airline or other identifier. The flow may then proceed to 307 where the computing device determines whether or not the airline or other identifier is provided. If so, the flow may proceed to 308 where the computing device may transmit the airline or other identifier to the airline computing system. Otherwise, the flow may proceed to 304 where the computing device may output an error that electronic boarding pass information cannot be obtained.

Although the additional operations 300 are illustrated and described as including particular operations performed in a particular order, it is understood that this is an example. In various implementations, various orders of the same, similar, and/or different operations may be performed without departing from the scope of the present disclosure.

For example, in some implementations, a person may not be able to enroll at the computing device. In such an implementation, the flow may proceed from 301 directly to 304 and the person may utilize other means to enroll.

Figure 4:
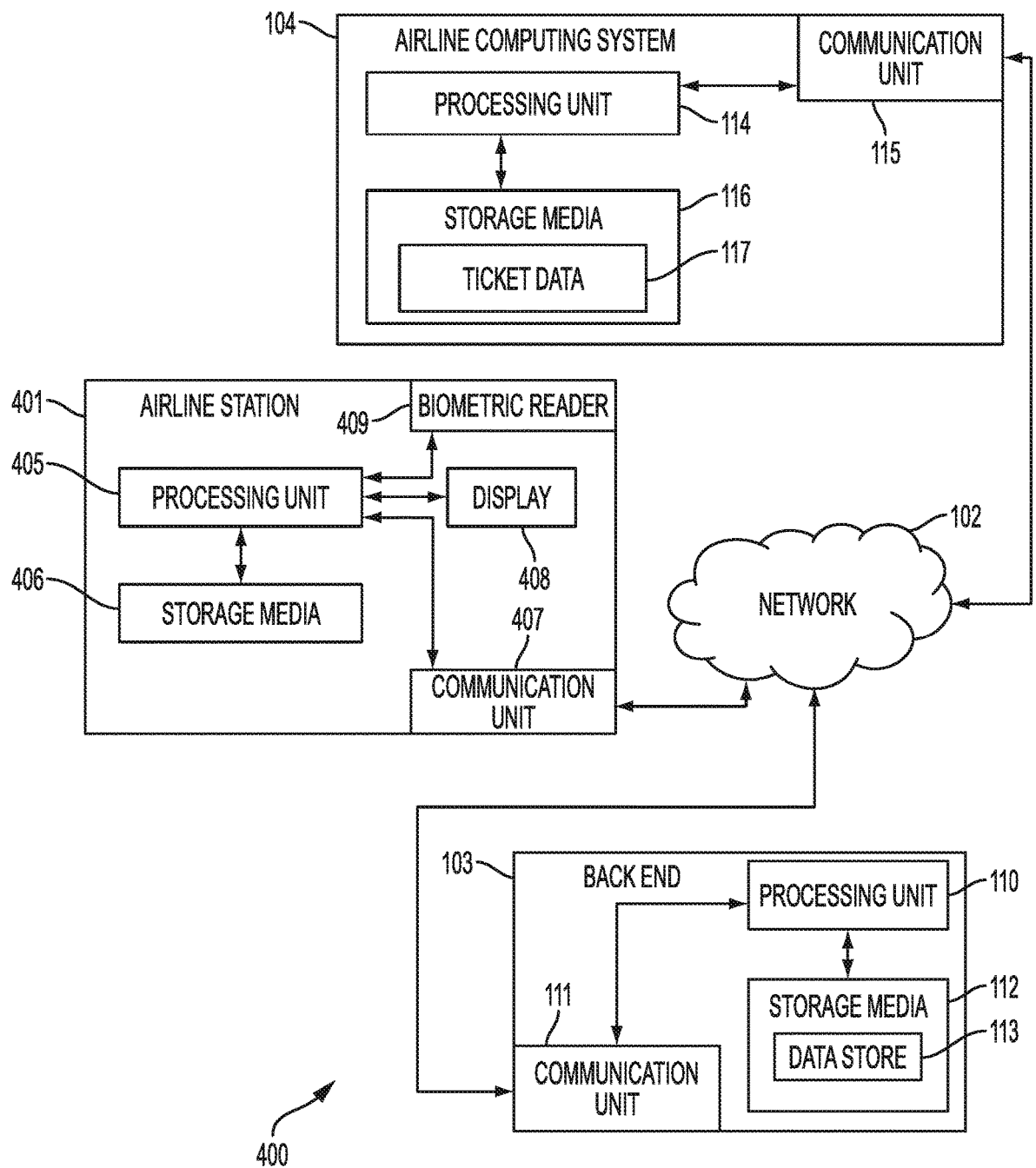
FIG. 4 is a block diagram illustrating a boarding pass-less airline processing system.

FIG. 4 is a block diagram illustrating a boarding pass-less airline processing system 400. The system 400 may include an airline station computing device 401 communicably coupled to a security back end 103 and an airline computing system 104 via one or more wired or wireless communication networks 102 (which in some implementations may be the security back end 103, the airline computing system 104, and/or the network 102 of the system 100 of FIG. 1).

Similar to the security station computing device 101 of the system 100 of FIG. 1, the airline station computing device 401 may include one or more processing units 405, non-transitory storage media 406, communication units 407, displays 408, and/or biometric readers 409. The processing unit 405 may execute one or more instructions stored in the storage media 406 to perform one or more functions related to check in of flyers (such as purchasing flights or upgrades to existing flights, confirming that a person will be on a flight, assigning seat numbers, checking baggage, and so on), boarding of flyers (such as allowing a person on board a flight, confirming that the person has gone on board the flight, and so on), and so on.

For example, the processing unit 405 may execute instructions allowing the airline station computing device 401 to obtain biometric data from a person, transmit the biometric data to the security back end 103, receive an identifier for the person from the security back end 103, transmit the identifier to the airline computing system 104, and receive electronic boarding pass information from the airline computing system 104. The airline station computing device 401 may then display the electronic boarding pass information on the display 408 as part of and/or to otherwise facilitate check in, boarding, and/or other operations.

In this way, a person may be able to check in, board, and/or participate in other operations without obtaining a boarding pass and/or providing identification other than the biometric. When combined with the system 100 of FIG. 1, a person may be able to proceed through an entire airport experience without ever obtaining a boarding pass and/or providing identification other than the biometric. This may be a less burdensome process for flyers and/or airlines than a traditional airline processing system. This may also be more cost effective for airlines as they may be able to omit issuing boarding passes to flyers, training staff to validate various forms of identification, and so on.

Figure 5:
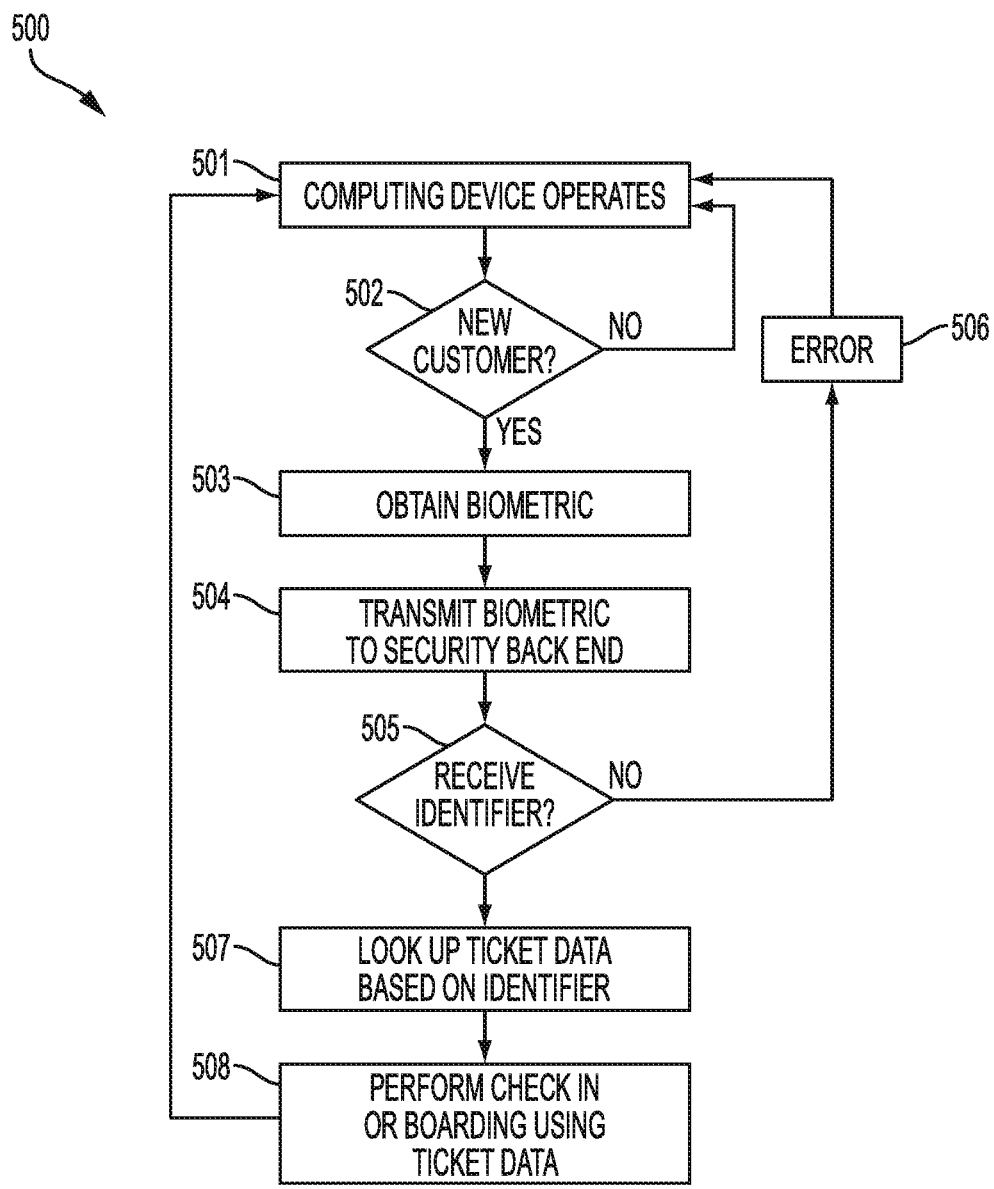
FIG. 5 is a flow chart illustrating a method for boarding pass-less airline processing. This method may be performed by the system of FIG. 4.

FIG. 5 is a flow chart illustrating a method 500 for boarding pass-less airline processing. This method 500 may be performed by the system 400 of FIG. 4.

At 501, a computing device may operate. At 502, the computing device may determine whether or not a new customer is to be processed. Such processing may be for check in, boarding, and/or other airline processing operations. If not, the flow may return to 501 where the computing device continues to operate. Otherwise, the flow may proceed to 503.

At 503, after the computing device determines a new customer is to be processed, the computing device may prompt for the person to provide a biometric. The flow may then proceed to 504 where the computing device may transmit the biometric to a back end of a security system. The back end of the security system may match the biometric to a user account or other data store entry that identifies the person associated with the biometric and may provide an airline and/or other identifier in response.

Next, the flow may proceed to 505 where the computing device determines whether or not an airline and/or other identifier is received from the back end of the security system in response to transmitting the identifier. If not, the flow may proceed to 506. Otherwise, the flow may proceed to 507.

At 506, after the computing device determines that the airline and/or other identifier for the person is not received, the computing device may output an error message. The flow may then return to 501 where the computing device continues to operate.

At 507, after the computing device determines that the airline and/or other identifier for the person is received, the computing device may look up ticket data and/or other boarding pass information based on the airline and/or other identifier. For example, the computing device may transmit the airline and/or other identifier to an airline computing system and receive the ticket data and/or other boarding pass information in response.

Next, the flow may proceed to 508 where the computing device may perform one or more check in, boarding, and/or other airline processing operations using the ticket data and/or other boarding pass information. The flow may then return to 501 where the computing device continues to operate.

Although the example method 500 is illustrated and described as including particular operations performed in a particular order, it is understood that this is an example. In various implementations, various orders of the same, similar, and/or different operations may be performed without departing from the scope of the present disclosure.

For example, the example method 500 is illustrated and described at 505-506 as outputting an error message if an identifier for the person is not received. However, in various implementations, the computing device may utilize other mechanisms to identify the person if an identifier is not received. For example, the computing device may direct an operator to manually identify the person by having the person produce a state issued driver's license or identification card, passport, or other form of identification. Various configurations are possible and contemplated.

By way of another example, 503 is illustrated and described as prompting a person to provide a biometric. However, in various implementations, a system may first attempt to identify a person using a first type of biometric that can be obtained automatically and prompt the person for a second type of biometric that the person provides if the person cannot be identified using the first type of biometric with a sufficient level of confidence. For example, a camera may automatically scan faces and/or gaits of people and attempt to identify them. If a person cannot be identified based on the scan of their face and/or gait with sufficient confidence, the system may prompt the person to provide a fingerprint and/or allow a retina scan.

By way of yet another example, the example method 500 is illustrated and described prompting a person to provide a biometric, identifying the person based on the biometric, looking up ticket data based on the identification, and performing check in, boarding, and/or other airline processing using the ticket data. However, it is understood that this is an example. In some implementations, information that a person has entered an airport and/or passed security may be obtained. Passive biometric readers (such as cameras) may monitor gate, lounge, or other areas for people who have been identified as having entered the airport and/or passed security. For example, facial images and/or gaits may be analyzed based on known present people to determine when such people enter gate, lounge, or other areas. Various actions may then be performed, such as offering an amenity based on a loyalty status or other qualification. For example, bottled water may be offered to reward account members when those members enter a gate area. By way of another example, first class passengers may be escorted to the front of a queue to board a plane upon entry to a gate area if boarding has commenced. Various configurations are possible and contemplated without departing from the scope of the present disclosure.

Figure 6:
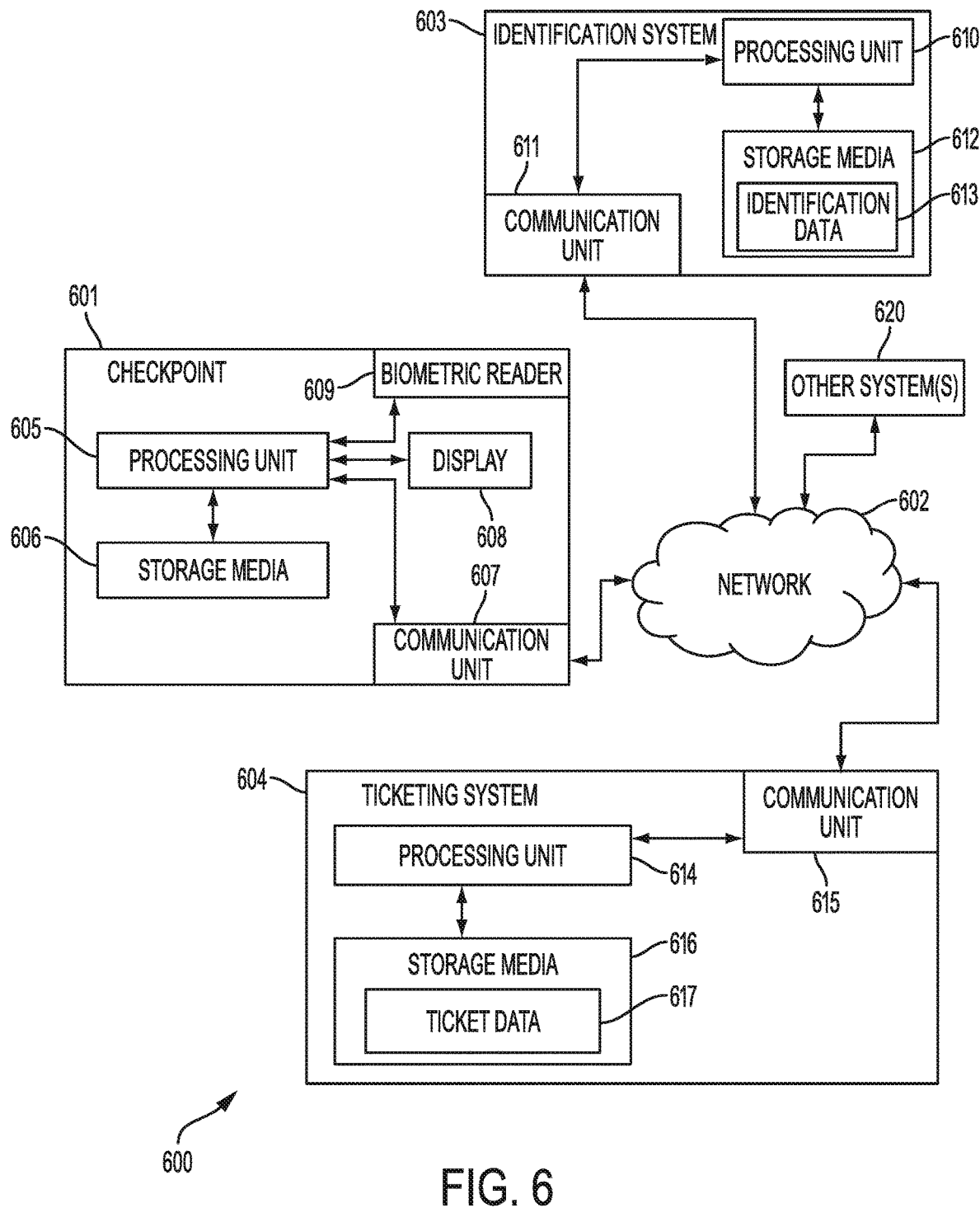
FIG. 6 depicts a system for token-less ticketing.

FIG. 6 depicts a system 600 for token-less ticketing. The system 600 may include a checkpoint device 601, an identification system device 603, and a ticketing system device 604. The checkpoint device 601, the identification system device 603, and/or the ticketing system device 604 may be communicably connected via one or more wired or wireless communication networks 602.

The checkpoint device 601 may receive one or more biometrics directly or indirectly from one or more people. The checkpoint device 601 may directly receive a biometric when the biometric reader 609 and/or another component incorporated into the checkpoint device 601 receives the biometric. The checkpoint device 601 may indirectly receive a biometric when the checkpoint device 601 received the biometric and/or a digital representation thereof from another device (such as a biometric reader 609 that is separate from the checkpoint device 601 but is communicably coupled to the checkpoint device 601). For example, a person may use an application on his mobile device to scan an image of his face and the application may transmit the scan to the checkpoint device 601.

The checkpoint device 601 may provide a digital representation of the received biometric (such as one or more images, hashes, and/or other abstracted, encoded, and so on electronic representations of the received biometric). The digital representation of the received biometric may be provided to the identification system device 603. The identification system device 603 may identify the person based on the digital representation of the received biometric and ascertain an identifier for the person using the digital representation of the received biometric. The identification system may provide the identifier. The identifier may be provided to the ticketing system device 604. The ticketing system device 604 may ascertain ticketing information for the person using the identifier. The ticketing system device 604 may provide the ticketing information. The ticketing information may be provided to the checkpoint device 601. The checkpoint device 601 may present the ticketing information and/or determine whether to approve or deny the person for entry based on the ticketing information.

For example, the checkpoint device 601 may be associated with entry screening into a ticketed area, such as entry into a venue for a sporting event, a flight, a vehicle rental, a lodging rental, a concert, a performance, a movie, and so on. The ticketing information may indicate whether or not the person is entitled to (i.e., has a ticket or similar authorization for) entry. For example, the ticketing information may indicate that the person has purchased a ticket for the event for which entry is being screened. Alternatively, the ticket information may indicate the person is not authorized and should be denied entry. For example, the ticket information may indicate that the person has not purchased a required ticket, the person already entered (such as where the person purchased a ticket but already used it for entry, entry does not require a ticket but entrance is limited to a particular number of times the person already entered more than the particular number of times, or the like), and so on.

In some implementations, an entitlement level may be determined for the person as opposed to either allowing or denying the person. The person may be allowed access and/or other actions may be performed based on the determined entitlement level. For example, the person may have a VIP entitlement level which allows them access to a main area and a backstage area whereas another person may have a general level entitlement which allows them access to the main area only. By way of another example, a person may have a fan club entitlement level which allows them entrance and a free t-shirt whereas another person who has a non-fan club entitlement level may be allowed entrance but not a free t-shirt.

In various implementations, the checkpoint device 601 and/or a related device may provide various items to the person upon checking the person. For example, a credential such as a paper ticket with a seat assignment may be provided. By way of another example, the person may be provided a discount card allowing them to purchase goods or services within the ticketed area at a discount.

In numerous implementations, the checkpoint device 601, the identification system device 603, and/or the ticketing system device 604 may be communicably connected to one or more other systems 620 via the communication networks 602. For example, the checkpoint device 601, the identification system device 603, and/or the ticketing system device 604 may be connected to one or more governmental, proprietary, and/or other age verification databases (such as department of motor vehicles databases, state identification databases, and so on), suspect person or other security list databases, and so on. For example, one or more devices of the system 600 may verify the age of a person along with ticket information as part of determining whether or not to allow a person entry (such as where a concert is a twenty-one or over show) and the device(s) may communicate with such databases as part of screening for entry. By way of another example, one or more devices of the system 600 may ascertain whether or not the person is listed in a suspect person or other security list database as part of determining whether or not to allow a person entry (such as where entry is denied and/or security screening and/or heightened security screening is to be performed on people listed as having active warrants, listed on terrorist watch lists, and so on) and the device(s) may communicate with such databases as part of screening for entry.

In various implementations, the checkpoint device 601 may include one or more processing units 605, non-transitory storage media 606 (which may take the form of, but is not limited to, a magnetic storage medium; optical storage medium; magneto-optical storage medium; read only memory; random access memory; erasable programmable memory; flash memory; and so on), communication units 607, displays 608 or other presentation components, biometric readers 609 (such as one or more fingerprint or palm print scanners, retinal scanners, iris scanners, cameras and/or 3D sensors that capture a facial biometric, cameras that detect the gait of a person, and so on), and/or other components. Similarly, the identification system device 603 and/or the ticketing system device 604 may include one or more processing units 610 and/or 614, storage media 612 and/or 616, communication units 611 and/or 615, and/or other components. Each of the checkpoint device 601, the identification system device 603, and/or the ticketing system device 604 may be one or more of a variety of different computing devices such as a desktop computing device, a laptop computing device, a tablet computing device, a mobile computing device, a smart phone, multiple computing devices in a cloud or other cooperative or other computing system configuration, a server computing device, and so on.

The processing unit 605 of the checkpoint device 601 may execute one or more instructions stored in the storage media 606 to perform one or more functions for the checkpoint device 601. For example, the checkpoint device 601 may obtain biometric data (such as an image or other electronic representation of a fingerprint, palm print, retina scan, iris scan, gait, and/or other biometric) from a person. In some implementations, the checkpoint device 601 may transmit a digital representation of the biometric data to the identification system device 603, which may use the digital representation of the biometric data to look up an identifier for the person (such as a name of the person, an email of the person, a phone number of the person, a ticketing system account number for the person, a state identification number for the person, a social security number for the person, combinations thereof, portions thereof, and so on) in identification information 613 stored in the storage media 612. Based thereon, the checkpoint device 601 may receive the identifier, such as from the identification system device 603. The checkpoint device 601 may transmit the identifier to the ticketing system device 604, which may look up ticketing information for the person based on the identifier in ticket data 617 stored in the storage media 616. In response, the checkpoint device 601 may receive the ticketing information, such as from the ticketing system device 604.

Although the above describes particular interactions between the checkpoint device 601, the identification system device 603, and the ticketing system device 604, it is understood that this is an example. For example, the identification system device 603 may instead provide the identifier to the ticketing system device 604, which may then provide the ticketing information to the identification system device 603, the checkpoint device 601, and so on. In various examples, various intermediate devices may communicate with the checkpoint device 601, the identification system device 603, and/or the ticketing system device 604 to act as intermediaries for one or more of these and/or other communications rather than the checkpoint device 601, the identification system device 603, and/or the ticketing system device 604 communicating directly. Various configurations are possible and contemplated without departing from the present disclosure.

The checkpoint device 601 may display or otherwise present the ticketing information on the display 608 as part of the ticketing and/or other check in process, such as to clear the person, allow or deny the person entry into the ticketed area, facilitate security and/or heightened security screening, and so on. For example, security screening personnel may check the displayed ticketing information to verify that the person is authorized to enter the ticketed area, meets any appropriate restrictions (such as minimum age, not on a terrorist watch list, or the like), search the person and/or any belongings of the person to verify that the person meets one or more security screening criteria, provide guidance or assistance to the person, and so on. In this way, the ticketing and/or other check in process may be performed without the person providing a paper ticket or other physical token and/or identification other than the biometric.

This may simplify ticketing and/or any other check in process for the checkpoint device 601 operator, venue operator, and/or other entity in a number of ways. For example, the person may be freed from having to obtain and/or produce a paper ticket or other physical token and/or identification. By way of another example, the checkpoint device 601 operator, venue operator, and/or other entity may not have to train security personnel to evaluate the validity of various forms of identification (such as state issued identification, passports, and so on). Additionally, the checkpoint device 601 operator, venue operator, and/or other entity may receive authorization to provide different levels of physical screening.

Additionally, as the ticketing information may be obtained from the ticketing system device 604, such as in real time, the ticketing information may not be forged by the person or similar party. Additionally, anti-scalping and/or other protections may be implemented, such as where entry may be denied despite authorization indicated in ticketing information if the person is associated with more than a threshold number (such as more than one, more than ten, and so on) number of different tickets or other entitlements, the ticketing information indicates improper transfer of the ticketing information between persons, and so on. Since the ticketing information is obtained in real time, the ticketing information can include a current status of the ticketing information (such as whether or not an authorization associated with the ticketing information was cancelled subsequent to purchase, current seating assignment, current entitlement level, previous use or entry, and so on), which may be used to determine whether or not to allow or deny the person entry and/or what kind of entry or other goods or services to allow or provide to the person.

By way of example, checkpoint devices may be positioned at the entrances to a ballpark. People may provide a fingerprint, iris scan, or other biometric to one of the checkpoint devices. A digital representation of the biometrics may be used to identify the people and obtain identifiers for the people. The identifiers may be used to obtain ticketing information for the people. Based on the ticketing information, the people may be allowed or denied entry.

In another example, checkpoint devices associated with automatic gates may be positioned at the entrances to a concert venue. Cameras and/or 3D sensors associated with the checkpoint devices may obtain images of the gait of people, of their faces, or other biometrics as they approach the automatic gates. A first gate may lead into a general ages area whereas a second gate may lead into a twenty-one or over area. A digital representation of the biometrics may be used to identify the people and obtain identifiers for the people. The identifiers may be used to verify ages of the people and obtain ticketing information for the people. Based on the age verification and the ticketing information, the automatic gates may open and/or not open for the people. The first gate may open if the person has purchased or been given a ticket. The second gate may open if the person has purchased or been given a ticket and is verified to be twenty-one years of age or over.

In still another example, checkpoint devices associated with automatic gates may be positioned at the entrances to a concert venue. The checkpoint devices may use "low-touch" biometric readers to identify people and open the automatic gates if the people can be identified with sufficient confidence as having purchased a ticket. Low-touch biometric readers may be biometric readers (such as cameras and/or 3D sensors that obtain images of the gait of people and/or their faces) that do not require as much time and/or effort as "heavier-touch" biometric readers (such as fingerprint scanners). If the checkpoint devices cannot identify a person with sufficient confidence using the low-touch biometric readers, the checkpoint devices may not open the automatic gates. Instead, the person may be diverted to a heavier-touch biometric reader, or to an area where the person may provide physical identification (such as a driver's license).

In yet another example, checkpoint devices may be arranged on the walkways into a park for a speaking engagement being presented in the park. Tickets may not be required, but each unique person may only be allowed in once. People may provide a fingerprint, iris scan, or other biometric to one of the checkpoint devices. A digital representation of the biometrics may be used to identify the people and obtain identifiers for the people. The identifiers may be used to obtain ticketing information for the people, which may indicate whether or not the person has previously entered rather than any purchased ticket. Based on the ticketing information, the people may be allowed or denied entry.

By way of another example, checkpoint devices may be arranged at the entry to a museum. The checkpoint devices may biometrically identify people and determine exhibits that have been added or changed since the people last visited. Directions or other information about such additions or changes may be provided. For example, a map showing a path between additions and/or changes may be printed, sent to a person's mobile device, and so on.

By way of another example, checkpoint devices may be arranged at the entry to a theme park. The checkpoint devices may biometrically identify people and determine preferences stored for the people. Various functions may be performed according to those preferences. For example, a person may have preferences set to automatically book a place in line on particular rides. Upon identification, places in line on those particular rides may be booked. Confirmation of such reservations may be provided, such as via a printout, messages sent to the person's email account or mobiles devices, and so on.

In some implementations, the checkpoint device 601 may validate the ticketing information. For example, the checkpoint device 601 may determine whether or not the ticketing information indicates the person has a ticket for entry at the venue or other ticketed area which the checkpoint device 601 operates and/or is otherwise associated within a particular time period (such as that calendar day, within twenty four hours, and so on), the particular entrance at which the checkpoint device 601 operates (such as where a floor level ticket enters through a first entrance whereas a balcony level ticket enters through a second entrance, where general admission tickets can only enter through a main entrance whereas VIP tickets can enter through a main entrance and/or expedited entrances, and so on), and so on. The security checkpoint device 601 may present such validation information (such as via the display 608) to facilitate the ticketing and/or any other check in process by operating personnel.

In various implementations, the checkpoint device 601 may communicate with an access restriction device as part of allowing or denying a person entry. For example, the checkpoint device 601 may be a device that obtains the biometric but does not restrict access of the person to the ticketed area. Instead, an associated restriction device, such as an automated turnstile, may restrict access of the person to the ticketed area. The checkpoint device 601 (and/or another device and/or intermediate device) may communicate with the access restriction device regarding whether to allow or deny the person. If the access restriction device receives an indication to allow the person, the access restriction device may operate to allow the person entry to the ticket area. For example, an automated turnstile may open and/or otherwise allow the person to move through into the ticketed area.

In some examples, the checkpoint device 601 may determine whether or not an identified person has a ticket or other entitlement to enter a ticketed or other area. In various implementations, the checkpoint device 601 may determine that the person does not have such a ticket or other entitlement, and may then prompt the person to purchase such. In some cases, the system 600 may obtain payment information for the person and obtain such a ticket or other entitlement accordingly.

In various cases, the system 600 may determine a person has a ticket but that superior tickets are available. For example, the system 600 may determine that a person has an upper deck seat at a concert venue and that front row seats are still available. As such, the system 600 may offer the person the opportunity to upgrade their seating assignment at the time that their ticketing information is verified.

In some examples, the system 600 may determine that a first person has a ticket but that a second person who the first person knows may also have a ticket. The system 600 may inform the first person of this fact and/or offer the first person the opportunity to sit with the second person. In some cases, the first person may not even be aware that the second person has a ticket. In various cases, the system 600 may determine that the first person knows the second person based on "friend" information the first person or second person have provided, information obtained from various social media networks, and so on.

In numerous examples, a person may attempt to enter a venue without providing proof of a purchased ticket. The system 600 may identify such a person by capturing an image of the person's face, identify the person, access payment information for the person, and purchase a ticket for the person automatically. Unauthorized entry may be assumed to be authorization to charge the person for a ticket and as such the system 600 may automatically charge people who enter without legitimately purchasing tickets. In some cases, a collection agency or other authority may be used to obtain payment for a person who has entered but does not have payment information available to the system 600. In other implementations, the system 600 may transmit information about the unauthorized entry, such as including the digital representation of the biometric, to a law enforcement or other authority.

In various examples, the system 600 may accommodate one or more rewards programs. For example, the other systems 620 may include a reward system computing device such as a frequent ticket buyer program, a credit card rewards program used to purchase tickets, and so on. Such a rewards program may be incorporated into the system 600 in a variety of ways.

For example, season ticket holders at a ballpark may be entitled to half price concessions at any concession stand at the ballpark. Screening at an entrance of the park may notify a person of such an entitlement by presenting them with an associated coupon. Alternatively, a season ticketholder may be biometrically identified upon arrival at concession stands in the ballpark and any discount may be applied to their order at the concession stand. The system 600 may additionally send the person notifications while they are in the ballpark regarding specials, discounts to which they are entitled to, freebies they are entitled to, and so on. For example, the system 600 may transmit messages to a person's mobile telephone or other mobile device during a ballgame that they have earned a free hot dog and to come and claim such at an associated hot dog stand, where soft drinks are now 50% off.

In various examples, concessions or similar stations within a ticketed area may also verify entitlement to be in the ticketed area in addition to implementing rewards programs. For example, a person may sneak into a ballpark and then have their facial image captured while attempting to purchase a hot dog. The system 600 may identify the person, determine that the person was never verified as having a ticket at a station entering the ticketed area, and summon security to apprehend the person or eject them from the ticketed area.

By way of another example, the system 600 may recognize when a person attending a ticketed event at a venue has attended a certain number of events. In some cases, a ticketing agency may provide ticketing for various different events at a number of different venues and may operate a rewards program for people who attend various ticketed events. Upon determining that a person has attended a particular number of events, the person may be provided a reward. The reward may be an upgraded seating assignment, discounts on food or beverages, free tickets to other events, and so on. In some implementations, messages may be sent to a person, such as to their email account, that they are approaching a reward level after they check in to an event. For example, an email may be sent to a person after a camera recognizes them entering a concert and their ticket is automatically verified that they qualify for a free ticket if they purchase food while at the concert.

In yet other examples, the system 600 may recognize an identified person is part of a group and take actions accordingly. For example, an identified person may be determined to be part of a school group that all have tickets to a concert. The system 600 may assign seating upon entrance. In such an example, the system 600 may assign all people determined to be part of the school group to the same seating area. This can allow the school group to all sit together, isolate the school group from other people, and so on.

In numerous examples, ticketing information may be associated with a package. For example, a person may purchase a ticket for a cruise ship as well as various meal and entertainment options associated with the cruise ship. The system 600 may identify the person upon entry to the cruise ship as well as determine the various entitlements associated with the person for various meal and entertainment venues on the cruise ship. As such, the person may be tracked and/or verified at various venues throughout the cruise ship and allowed or denied various access to the various venues based on the package to which the person is entitled.

Similarly, a person may have a special line pass associated with an amusement park. When the person purchases entrance to the amusement park, their special line pass may be associated with them. This may allow them to board rides through special accelerated lines, allow them to access areas to which other ticketed people are prevented from going, and so on. Various arrangements are possible and contemplated.

In other examples, the system 600 may monitor people after they have entered a ticketed area and take various actions. For example, a concert venue may use cameras and facial images of identified people to track their actions throughout the concert venue. The concert venue may perform a variety of actions, such as tracking when a person approaches a concession stand and does not purchase in order to send text messages to them regarding discount offers for that concession stand.

By way of another example, the system 600 may use facial recognition to determine that the person has become intoxicated at a venue and may offer to call the person a cab, summon security, and/or perform similar actions. In other examples, the system 600 may track alcohol or other purchases made by the person by identifying them using biometrics when purchases are made and making assumptions about potential intoxication using such purchase data rather than facial or other recognition of actual intoxication. Various arrangements are possible and contemplated.

The above illustrates and describes the system 600 using multiple devices that communicate with each other. However, in some implementations, the network 602 may become unavailable. In such a circumstance, one or more devices may delay operations until the network 602 is again available, may cache information from other devices in order to be able to continue to function when the network 602 becomes unavailable, and so on. Various configurations are possible and contemplated.

For example, in some implementations, the system 600 may store a portion of the identification data 613 and/or the ticket data 617 at the checkpoint device 601 or similar device local to the checkpoint device 601. In some examples of such implementations, portions of the identification data 613 and/or the ticket data 617 corresponding to people who have tickets for an event associated with the checkpoint device 601 may be stored at the checkpoint device 601, such as in the storage media 606. In this way, the checkpoint device 601 may be able to identify people who may have tickets for the event and/or verify their tickets without connecting to the identification system device 603 and/or the ticketing system device 604 via the network 602.

In such an implementation, various techniques may be used to protect the identification data 613 and/or the ticket data 617 from unauthorized access via the checkpoint device 601. For example, the identification data 613 and/or the ticket data 617 may be in an encrypted or protected area or software space which can receive queries from the checkpoint device 601 regarding the identification data 613 and/or the ticket data 617 as if the checkpoint were communicating with the identification system device 603 and/or the ticketing system device 604, but cannot access outside of such a query. In this way, the data may be stored at the checkpoint device 601 while still separating access to the digital representation of biometrics, identifiers, and ticketing information.

Similarly, in various implementations, one or more portions of the identification data 613 may be stored at the ticketing system device 604 or other device and/or one or more portions of the ticket data 617 may be stored at the identification system device 603. For example, subsets of the identification data 613 and/or the ticket data 617 may be so stored based on association with a particular event, location, venue, and so on. Similar to the above, various protection mechanisms may encrypt and/or protect such data in order to maintain access separation of the digital representation of biometrics, identifiers, and ticketing information.

Although the above describes caching of information, such as the identification data 613 and/or the ticket data 617, at devices such as the ticketing system device 604 or identification system device 603 in the contexts of the system 600 for token-less ticketing, it is understood that this is an example. In various implementations, such caching could be used in the system 100 for boarding pass-less airport security screening of FIG. 1, the system 400 for boarding pass-less airline processing of FIG. 4, and so on. For example, in various implementations, the system 100 may store portions of the data store 113 and/or the ticket data 117 at the security station computing device 101 (such as portions corresponding to people who have flights at an airport associated with the security station computing device 101 on a current day). In such an example, the data may be encrypted and/or otherwise protected to ensure the same access separations implemented by the various devices illustrated in FIG. 1 and described above.

In numerous implementations, the system 600 of FIG. 6 may perform various other functions. For example, the system 600 may be operable to transfer ticketing information between different people. For example, the checkpoint device 601 and/or another device may be operable to receive a biometric from a transferring party and a transferee party.

The identification system device 603 may ascertain identifiers for both parties using digital representations of the respective biometrics. The ticketing system device 604 may then update stored ticketing information based on the transfer, the identifiers, and/or any provided instructions regarding what ticketing information to transfer and how. Various arrangements are possible and contemplated without departing from the scope of the present disclosure.

In various implementations, the above described ticketing and/or any other check in process may be part of a prescreened security process. In such a prescreened security process, the person may enroll in or be selected for a program where the person is determined to be less of a security risk than the general population such that the person is entitled to a lower security screening than the general population upon providing identification. Providing the biometric data to the checkpoint device 601 may be that identification and proof of participation.

Although the present disclosure is illustrated and described within the context of allowing access to ticketed and/or otherwise authorized entry areas and ticketing information, it is understood that this is an example. In various implementations, techniques of the present disclosure may be used in any context where a screening or checking entity performs entry authorization determination for a service or other provider that issues any kind of ticket or other kind of token to customers without departing from the scope of the present disclosure.

For example, a person may be issued a pass for entering a particular area such as a garage by an operator of the area. The person may be screened for entry into the area by third party security. In such an example, the person may provide a biometric to a device. The device may use a digital representation of the biometric to look up an identifier for the person associated with the operator of the area using an identification system and obtain access information from a computing device of the operator of the area using the identifier. In this way, the third party security may be able to determine whether or not the person can be cleared to access the area and/or what kind of screening to perform on the person without the person presenting a badge, presenting a ticket, entering a code, and/or otherwise providing identification other than the biometric.

However, it is understood that this is an example and other implementations are possible and contemplated. For example, in some implementations, the operator of the area may perform the screening instead of the third party security. In yet other implementations, the operator and the third party may cooperatively perform the screening.

Figure 7:
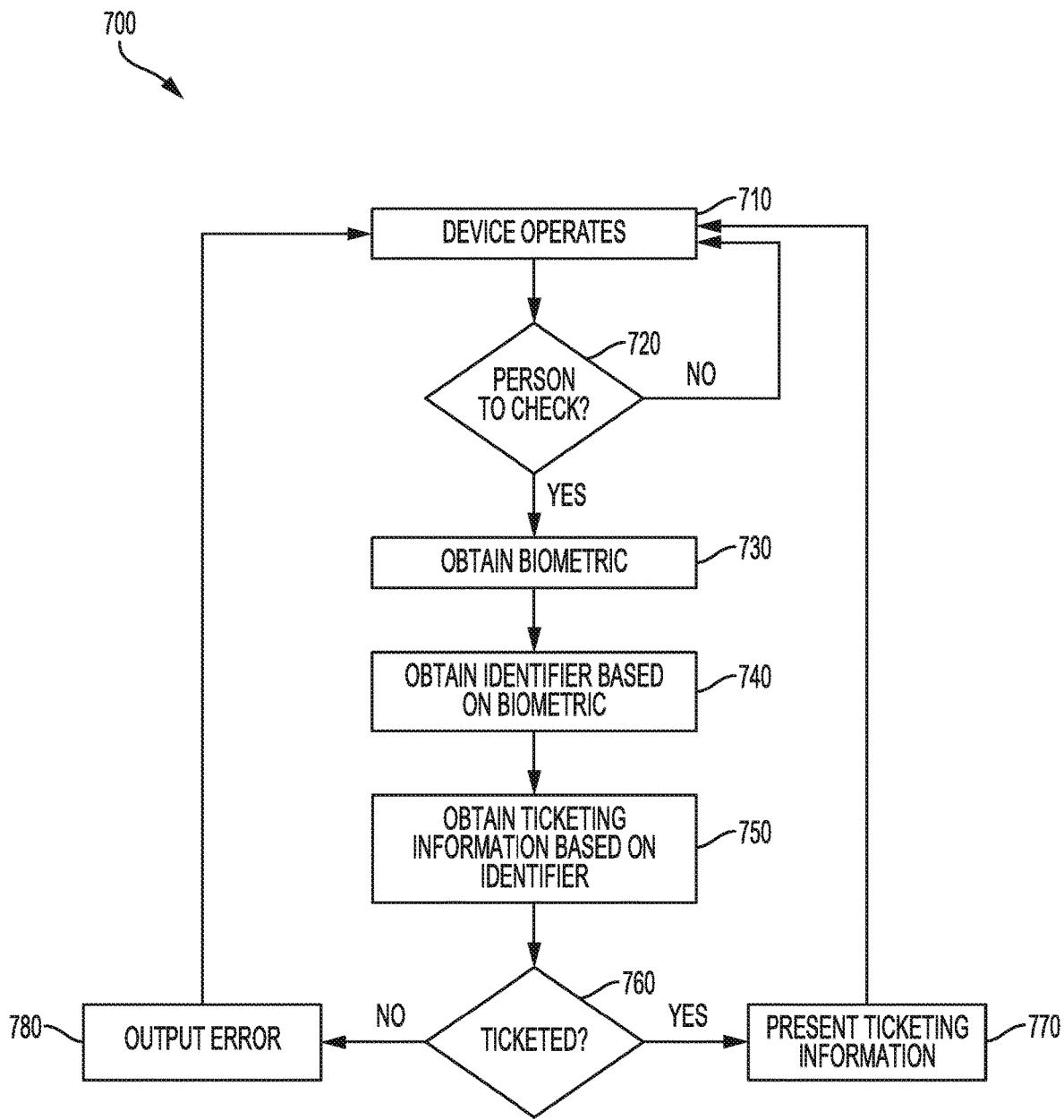
FIG. 7 depicts a flow chart illustrating a first example method for token-less ticketing. This method may be performed by the system of FIG. 6.

FIG. 7 depicts a flow chart illustrating a first example method 700 for token-less ticketing. This method 700 may be performed by the system 600 of FIG. 6.

At 710 a device operates. For example, the device may be the checkpoint device 601 of the system 600 of FIG. 6. The flow proceeds to 720 where the device determines whether or not there is a person to check. If so, the flow proceeds to 730. Otherwise, the flow returns to 710 where the device continues to operate.

At 730, after the device determines that there is a person to check, a biometric is obtained from the person. At 740, an identifier is obtained based on the biometric. For example, the device may provide a digital representation of the biometric to an identification system, which may provide an identifier obtained using the digital representation of the biometric. At 750, ticketing information may be obtained based on the identifier. For example, the identifier may be provided to a ticketing system (such as by the device, by the identification system, and so on), which may provide ticketing information obtained using the identifier.

The flow then proceeds to 760 where the device determines whether or not the person is ticketed and/or authorized to enter a ticketed or other area based on the ticketing information and/or other information. If so, the flow proceeds to 770. Otherwise, the flow proceeds to 780.

At 770, after the device determines the person is ticketed, the device presents the ticketing information and/or allows the person entry. The flow then returns to 710 where the device continues to operate.

At 780, after the device determines the person is not ticketed and/or is not authorized to enter, the device outputs an error. The flow then returns to 710 where the device continues to operate.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 illustrates and describes determining whether or not there is a person to check and obtaining the biometric as separate, linearly performed operations. However, in various implementations, the device may determine there is a person to check when a biometric is received or obtained. Various configurations are possible and contemplated.

In various examples, this example method 700 may be implemented as a group of interrelated software modules or components that perform various functions discussed herein. These software modules or components may be executed by one or more computing devices, such as the checkpoint device 601 and/or the identification system device 603 of FIG. 6.

Figure 8:
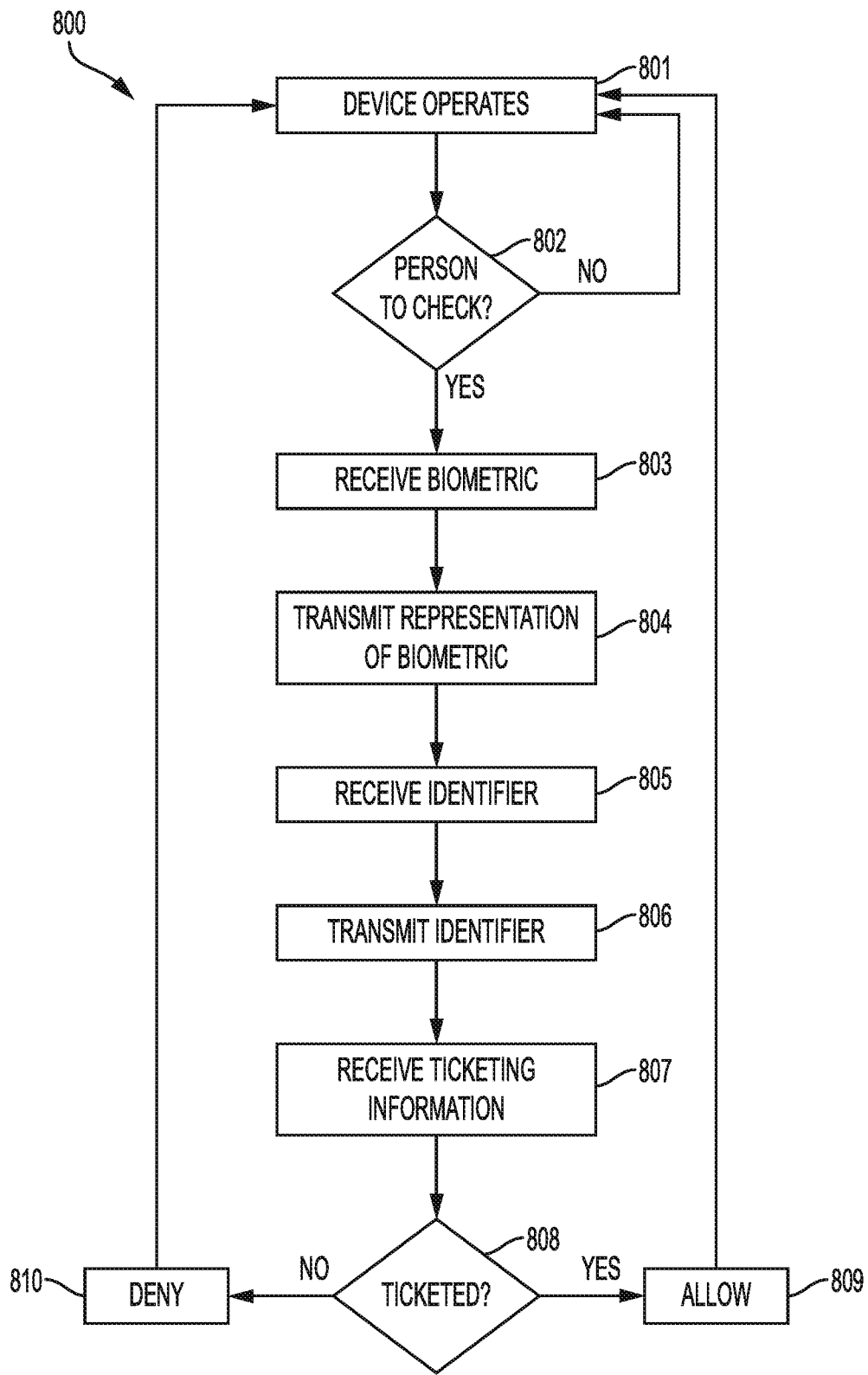
FIG. 8 depicts a flow chart illustrating a second example method for token-less ticketing. This method may be performed by the system of FIG. 6.

FIG. 8 depicts a flow chart illustrating a second example method 800 for token-less ticketing. This method 800 may be performed by the system 600 of FIG. 6.

At 801 a device operates. For example, the device may be the checkpoint device 601 of the system 600 of FIG. 6. The flow proceeds to 802 where the device determines whether or not there is a person to check. If so, the flow proceeds to 803. Otherwise, the flow returns to 801 where the device continues to operate.

At 803, after the device determines that there is a person to check, a biometric is received for the person. At 804, the device transmits a digital representation of the biometric. For example, the device may transmit the digital representation of the biometric to an identification system. At 805, the device receives an identifier obtained using the biometric. For example, the device may receive the identifier from the identification system after the identification system receives the digital representation of the biometric.

At 806, the device may transmit the identifier. For example, the device may transmit the identifier to a ticketing system. At 807, the device may receive ticketing information for the person. For example, the device may receive the ticketing information from the ticketing system after the ticketing system receives the identifier.

The flow then proceeds to 808 where the device determines whether or not the person is ticketed and/or authorized to enter a ticketed or other area based on the ticketing information and/or other information. If so, the flow proceeds to 809. Otherwise, the flow proceeds to 810.

At 809, after the device determines the person is ticketed and/or is authorized to enter, the device allows the person entry. The flow then returns to 801 where the device continues to operate.

At 810, after the device determines the person is not ticketed and/or the ticketing information indicates to deny the person entry, the device denies the person entry. The flow then returns to 801 where the device continues to operate.

By way of example, a device at the entrance to a vehicle rental lot may control entry. The device may biometrically identify a person and determine whether or not the person has reserved a vehicle (such as a car, truck, boat, aircraft, and so on) for rental. In this example, the ticketing information may indicate that the person has permission for a vehicle rental. If so, the person may be allowed to enter and claim the rented vehicle. In some cases, various actions may also be performed. For example, the vehicle may be configured according to preferences stored for the person, offers such as add on insurance or prepaid gas may be transmitted to the person's mobile device, directions to the vehicle may be provided, and so on.

By way of another example, a device at the entrance to a place of lodging (such as a motel, a hotel, an apartment, and so on) may control entry to lodgings available for rental. The device may biometrically identify a person and determine whether or not the person has rented one of the lodgings. In this example, the ticketing information may indicate that the person has permission for a lodging rental. If so, the person may be allowed to enter. In some cases, various actions may also be performed. For example, champagne or other perks may be placed in the rented lodging for the person based on a reward or loyalty account, offers such as room service may be transmitted to the person's mobile device, directions to the rented lodging may be provided, and so on.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as the device transmitting information such as the digital representation of the biometric and the identifier and receiving information such as the biometric, the identifier, and the ticketing information. However, it is understood that this is an example. In various implementations, this information may be exchanged between any number of different devices in any number of different arrangements and/or orders rather than the device transmitting and/or receiving the information as shown and described in this example.

In various examples, this example method 800 may be implemented as a group of interrelated software modules or components that perform various functions discussed herein. These software modules or components may be executed by one or more computing devices, such as the checkpoint device 601 and/or the identification system device 603 of FIG. 6.

Figure 9:
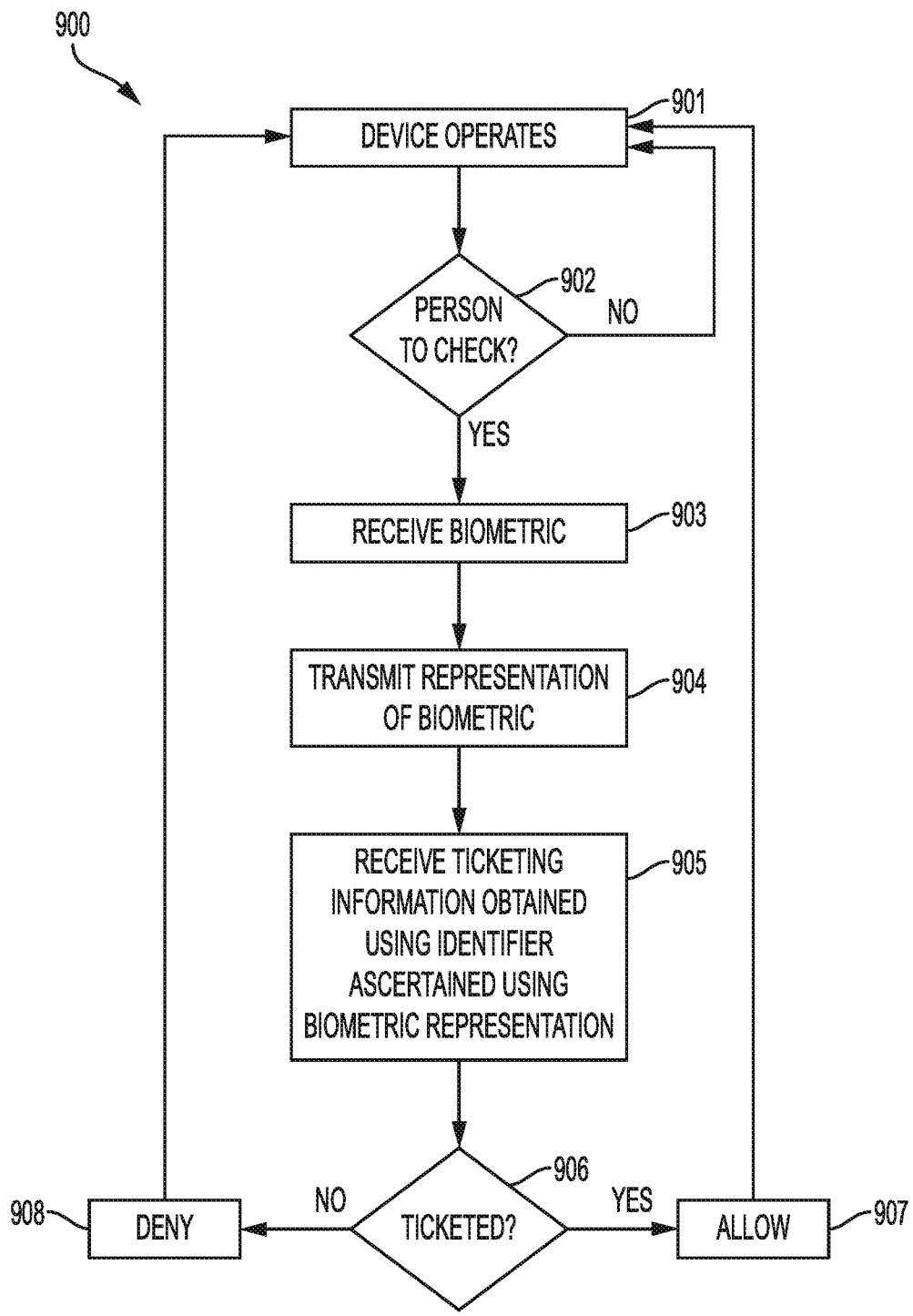
FIG. 9 depicts a flow chart illustrating a third example method for token-less ticketing. This method may be performed by the system of FIG. 6.

FIG. 9 depicts a flow chart illustrating a third example method 900 for token-less ticketing. This method 900 may be performed by the system 600 of FIG. 6.

At 901 a device operates. For example, the device may be the checkpoint device 601 of the system 600 of FIG. 6. The flow proceeds to 902 where the device determines whether or not there is a person to check. If so, the flow proceeds to 903. Otherwise, the flow returns to 901 where the device continues to operate.

At 903, after the device determines that there is a person to check, a biometric is received for the person. At 904, the device transmits a digital representation of the biometric. For example, the device may transmit the digital representation of the biometric to an identification system. At 905, the device receives ticketing information for the person obtained using an identifier ascertained for the person using the biometric information. For example, an identification system may be used to ascertain the identifier using a digital representation of the biometric and a ticketing system may be used to obtain the ticketing information using the identifier.

The flow then proceeds to 906 where the device determines whether or not the person is ticketed and/or authorized to enter a ticketed or other area based on the ticketing information and/or other information. If so, the flow proceeds to 907. Otherwise, the flow proceeds to 908.

At 907, after the device determines the person is ticketed and/or is authorized to enter, the device allows the person entry. The flow then returns to 901 where the device continues to operate.

At 908, after the device determines the person is not ticketed and/or the ticketing information indicates to deny the person entry, the device denies the person entry. The flow then returns to 901 where the device continues to operate.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 is illustrated and described as the device allowing or denying entry. However, it is understood that this is an example. In various implementations, the device may communicate based at least on the ticketing information with an access restriction device (such as an automated gate or turnstile) that may allow or deny the person access.

In various examples, this example method 900 may be implemented as a group of interrelated software modules or components that perform various functions discussed herein. These software modules or components may be executed by one or more computing devices, such as the checkpoint device 601 and/or the identification system device 603 of FIG. 6.

Figure 10:
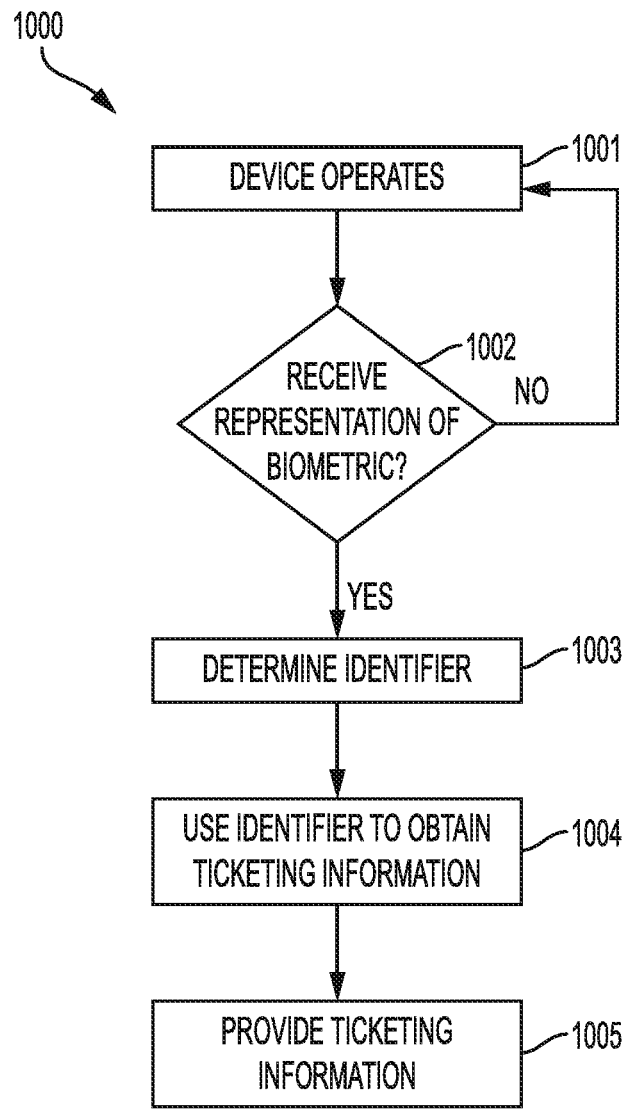
FIG. 10 depicts a flow chart illustrating a fourth example method for token-less ticketing. This method may be performed by the system of FIG. 6.

FIG. 10 depicts a flow chart illustrating a fourth example method 1000 for token-less ticketing. This method 1000 may be performed by the system 600 of FIG. 6.

At 1001 a device operates. For example, the device may be the identification system device 603 of the system 600 of FIG. 6. The flow proceeds to 1002 where the device determines whether or not a digital representation of a biometric for a person is received. If so, the flow proceeds to 1003. Otherwise, the flow returns to 1001 where the device continues to operate.

At 1003, after the device determines a digital representation of a biometric for a person is received, the device determines an identifier for the person. The flow proceeds to 1004 where the identifier is used to obtain ticketing information. For example, the identifier may be provided to a ticketing system, which may provide the ticketing information obtained using the identifier. At 1005, the ticketing information is provided. For example, the ticketing information may be provided to the device that provided the digital representation of the biometric.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described as using the identifier to obtain the ticketing information and providing the ticketing information. However, in some implementations, these operations may be omitted. In such implementations, such operations may be performed as part of another method and/or by various other devices. Various configurations are possible and contemplated.

In various examples, this example method 1000 may be implemented as a group of interrelated software modules or components that perform various functions discussed herein. These software modules or components may be executed by one or more computing devices, such as the checkpoint device 601 and/or the identification system device 603 of FIG. 6.

Figure 11:
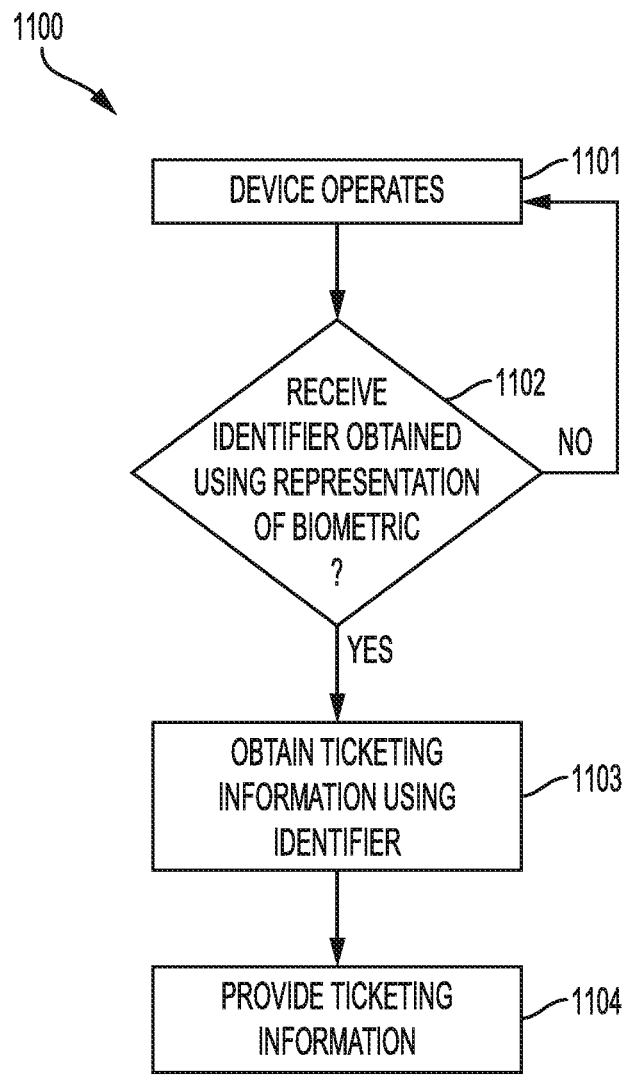
FIG. 11 depicts a flow chart illustrating a fifth example method for token-less ticketing. This method may be performed by the system of FIG. 6.

FIG. 11 depicts a flow chart illustrating a fifth example method 1100 for token-less ticketing. This method 1000 may be performed by the system 600 of FIG. 6.

At 1101 a device operates. For example, the device may be the ticketing system device 604 of the system 600 of FIG. 6. The flow proceeds to 1102 where the device determines whether or not an identifier obtained using a digital representation of a biometric for a person is received. If so, the flow proceeds to 1103. Otherwise, the flow returns to 1101 where the device continues to operate.

For example, the device may receive the identifier from an identification system that obtained the identifier using a provided digital representation of the biometric. The identification system may have received the digital representation of the biometric from one or more checkpoint devices.

At 1103, after the device determines whether or not an identifier obtained using a digital representation of a biometric for a person is received, the device obtains the ticketing information using the identifier. The flow proceeds to 1104 where the ticketing information is provided. For example, the device may provide the ticketing information to an identification system that provided the identifier, a checkpoint device that provided the digital representation of the biometric, and so on.

Although the example method 1100 is illustrated and described as including particular operations performed in a particular order, it is understood that this is an example. In various implementations, various orders of the same, similar, and/or different operations may be performed without departing from the scope of the present disclosure.

For example, the method 1100 is illustrated and described as receiving the identifier obtained using a digital representation of the biometric. However, in some implementations, the device may itself obtain the digital representation of the biometric and ascertain the identifier using the digital representation of the biometric. Various configurations are possible and contemplated.

In various examples, this example method 1100 may be implemented as a group of interrelated software modules or components that perform various functions discussed herein. These software modules or components may be executed by one or more computing devices, such as the checkpoint device 601 and/or the identification system device 603 of FIG. 6.

Figure 12:
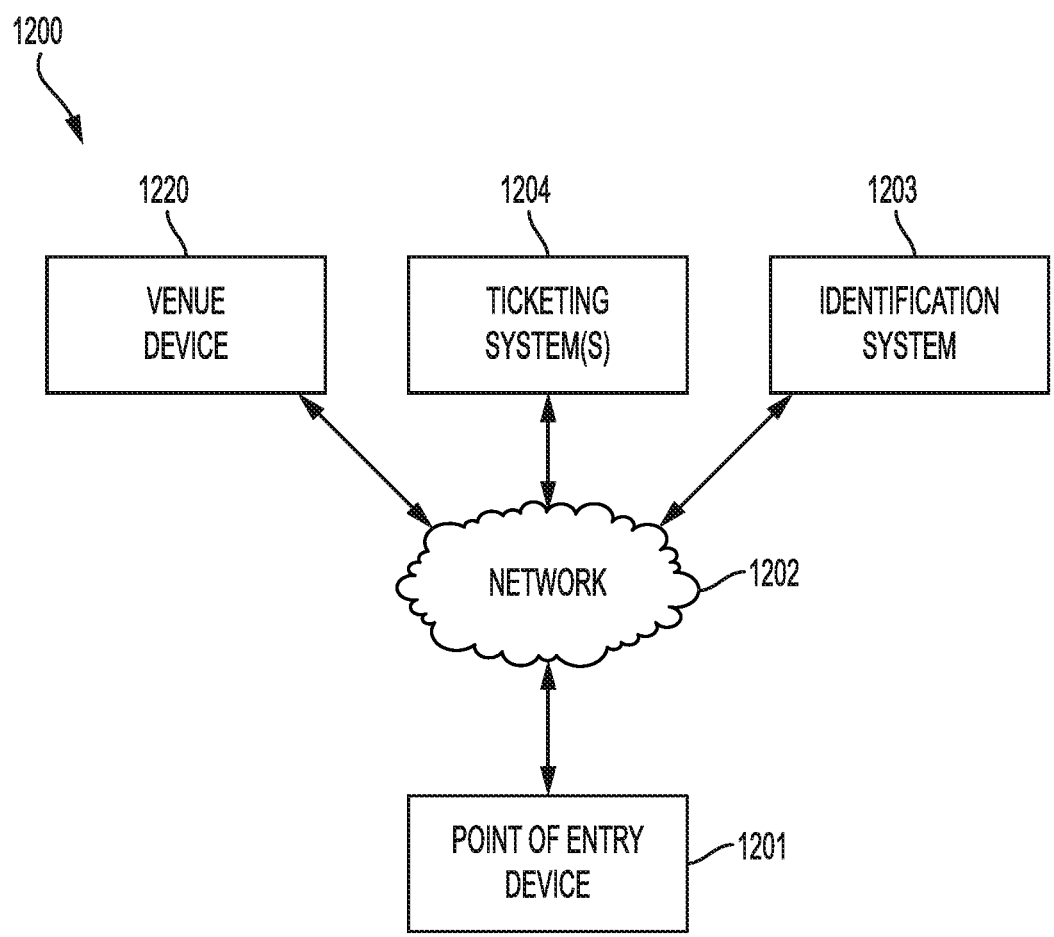
FIG. 12 depicts an example biometric ticketing system.

FIG. 12 depicts an example biometric ticketing system 1200. The biometric ticketing system 1200 includes a computing device that is operable to perform biometric ticketing. The computing device may perform biometric ticketing alone or by interacting with one or more other computing devices.

Such a computing device may be the point of entry device 1201. In some implementations, the point of entry device 1201 may be a device located at the point of entry to a venue or other area to which access is controlled based on ticketing information. As part of performing biometric ticketing, the point of entry device 1201 may communicate with a number of different devices. For example, the point of entry device 1201 may communicate with an identification system 1203, one or more ticketing systems 1204, a venue device 1220, and/or other devices via one or more networks 1202.

The point of entry device 1201 may receive a digital representation of a biometric. The point of entry device 1201 may identify a person based on the digital representation of the biometric. Based on the identification, the point of entry device 1201 may ascertain ticketing information based on the identification. The point of entry device 1201 may then provide the ticketing information and/or perform one or more other actions using the ticketing information.

For example, the point of entry device 1201 may receive a digital representation of a biometric via a biometric reader. A biometric reader may be any component operable to obtain a digital representation of a biometric. In some implementations, the biometric reader may be a camera and/or 3D sensor that captures an image of a face or portion thereof, such as an image of an iris, and/or a gait of the person. In other examples, the biometric reader may be a fingerprint or palm print scanner.

The identification system 1203 may be used to identify a person based on the digital representation of the biometric. For example, the point of entry device 1201 may transmit the digital representation of the biometric to the identification system 1203. The identification system 1203 may compare the digital representation of the biometric to stored biometric data. A person may be identified when the comparison results in a match or substantial match between the digital representation of the biometric and stored biometric data that is associated with the person.

The ticketing system 1204 may be used to obtain ticketing information. For example, an identifier may be associated with the biometric data and/or the person in the identification system 1203. The identifier may be a ticketing account number, a loyalty or rewards account associated with the person, a social security number or other identifier, a login, an email, a phone number, an account number, an arbitrary number, and/or any other identifier that may be used to identify the person. The identifier may be provided to the ticketing system 1204 after the identification system 1203 identifies the person. For example, the ticketing system 1204 may provide the identifier to the point of entry device 1201 to transmit to the ticketing system 1204, provide the identifier to the ticketing system 1204, and so on.

In some examples, the ticketing information may be provided to the venue device 1220. For example, in some implementations, the venue device 1220 may operate an access control device (such as a turnstile, gate arm, or the like) that controls access to a venue. In such an example, the ticketing information may be provided to the venue device 1220 and the venue device 1220 may operate the access control device to allow or deny access accordingly. Alternatively, another device, such as the point of entry device 1201, may evaluate the ticketing information and instruct the venue device 1220 to operate the access control device accordingly. By way of another example, in various implementations, the point of entry device 1201 may operate the access control device and may transmit information about access allowed, access denied, ticketing information evaluated, and so on to the venue device 1220. The venue device 1220 may use this information in a variety of ways. For example, the information may be used to track movement of people, presence of people in a venue or other area, determine that a particular person is present at the venue as opposed to another person using the person's ticket, to track timing of entry, determine operations information, provide personalized services, and so on.

In various examples, the ticketing system 1204 may include a first ticketing system device operated by a first ticketing issuer and a second ticketing system device operated by a second ticketing issuer. In such examples, the ticketing information may include ticketing information obtained from both the first ticketing system and the second ticketing system. In some implementations, a single identifier may be used to obtain the ticketing information from both the first ticketing system and the second ticketing system. In other implementations, separate identifiers may be used.

Each of the devices shown and discussed with respect to the biometric ticketing system 1200 may be implemented using one or more different electronic devices. Such electronic devices may include any sort of computing device having a variety of different components, such as one or more processors or other processing units, communication components, biometric readers (such as cameras, fingerprint sensors, and so on), non-transitory storage media, displays, input devices, and so on. Communication between the various devices may be encrypted, obscured, and/or otherwise secured. Various arrangements are possible and contemplated without departing from the scope of the present disclosure.

In various implementations, the biometric ticketing system 1200 may perform any of the functions described above with respect to the system 600 of FIG. 6. Various configurations are possible and contemplated without departing from the scope of the present disclosure.

Figure 13:
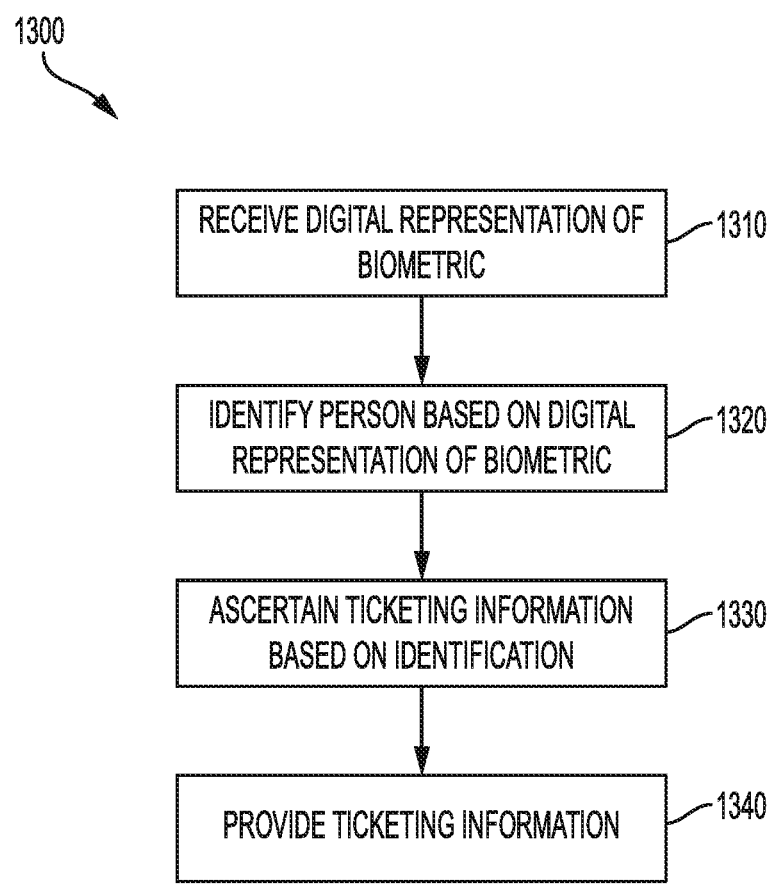
FIG. 13 depicts a flow chart illustrating a first example method for biometric ticketing. This method may be performed by the biometric ticketing system of FIG. 12.

FIG. 13 depicts a flow chart illustrating a first example method 1300 for biometric ticketing. This method 1300 may be performed by the biometric ticketing system 1200 of FIG. 12.

At 1310, a digital representation of a biometric may be received. For example, the digital representation of the biometric may be a scan of a fingerprint received from a fingerprint scanner, a facial image or portion thereof (such as an iris) received from a camera, and so on.

At 1320, a person may be identified using the digital representation of the biometric. For example, the digital representation of the biometric may be compared against stored biometric data associated with a number of different people. A person may be identified based on a match between the digital representation of the biometric and stored biometric data associated with the person.

At 1330, ticketing information may be ascertained based on the identification. For example, ticketing information associated with the person may be obtained. In some examples, identification of the person may include determining an identifier associated with the identified person. The ticketing information may be associated with the identifier. As such, the ticketing information may be obtained using the identifier.

For example, an identification system may be operable to provide the identifier associated with biometric data matching the digital representation of the biometric. One or more ticketing systems may be operable to provide ticketing information associated with the identifier when the identifier is provided.

At 1340, the ticketing information may be provided. The ticketing information may be provided as part of performing a variety of different actions, including determining whether or not to allow access based on the ticketing information.

For example, the method 1300 may be performed by a device that is operable to control access into a venue. In such an example, the ticketing information may be provided to a subroutine of the device that allows or denies access based on whether or not the ticketing information indicates that the person has a valid ticket. By way of another example, the method 1300 may be performed by a device that is operable to communicate with an access control device at a venue, such as a turnstile. The device may provide the ticketing information to the access control device and the access control device may allow or deny access based on the ticketing information. In yet another example, the method 1300 may be performed by the person's mobile telephone or other mobile computing device. In such an example, the mobile telephone may provide the ticketing information to an access control device at a venue (such as by presenting a barcode that may be scanned by a scanning component of the access control device, by transmitting a message to a wireless receiver of the access control device, and so on). Various configurations are possible and contemplated without departing from the scope of the present disclosure.

Although the example method 1300 is illustrated and described as including particular operations performed in a particular order, it is understood that this is an example. In various implementations, various orders of the same, similar, and/or different operations may be performed without departing from the scope of the present disclosure.

For example, 1330 is illustrated and described as ascertaining ticketing information. However, it is understood that this is an example. In some implementations, ascertaining ticketing information may be a portion of a larger operation. For example, ascertaining ticketing information may be part of the larger operation of obtaining ticketing information from another device. Various configurations are possible and contemplated without departing from the scope of the present disclosure.

By way of another example, 1340 is illustrated and described as providing the ticketing information. Providing may include displaying or otherwise presenting the ticketing information (whether encoded or encrypted, encoded in a form that can be scanned or other machine readable form, and so on), transmitting the ticketing information to another device, and so on. However, providing may also include providing the ticketing information to another process executing on the same device that makes use of the ticketing information in some way. Various arrangements are possible and contemplated without departing from the scope of the present disclosure.

In various examples, this example method 1300 may be implemented as a group of interrelated software modules or components that perform various functions discussed herein. These software modules or components may be executed by one or more computing devices, such as the point of entry device 1201 and/or the identification system 1203 of FIG. 12.

Returning to FIG. 12, the biometric ticketing system 1200 may be implemented in a variety of different ways. For example, the point of entry device 1201 may be a kiosk or other device located at the point of entry to a venue. In this example, the identification system 1203 may be one or more computing devices located remotely that the point of entry device 1201 communicates with in order to identify people using digital representations of biometrics. In some implementations, the point of entry device 1201 may communicate with the identification system 1203 each time an identification is to be performed.

In other implementations, the point of entry device 1201 may communicate with the identification system 1203 beforehand, such as by obtaining and storing information for all people who have both tickets for entrance to the venue and data stored in the identification system. In such an implementation, the point of entry device 1201 may identify people using the locally stored information and then communicate further with the identification system 1203 if a person cannot be identified using the locally stored information. This may allow at least some identification to be performed even if the network 1202 is unavailable. In some examples of such implementations, the point of entry device 1201 may be a device operated by an entity that operates the identification system 1203.

In other examples, the point of entry device 1201 may be an interface for an identification system 1203 that is also located at the venue. In some implementations, the point of entry device 1201 and the identification system 1203 may even be incorporated into a single device. In various implementations, the identification system 1203 may store a subset of available information (such as data for people who have tickets for the venue) and identifications may be performed using the locally stored information, communicating with one or more external data sources if the locally stored information cannot be used to identify a person. This may allow the system to operate without a currently functioning external network connection. This may also allow for faster and more efficient identification using less computing resources by searching a likely subset of available information and escalating to remaining available information if the first search fails rather than searching all available information each time.

In some implementations, the identification system 1203 may store information about where a subset of available information (such as data for people who have tickets for the venue) is stored in one or more external data sources. The identification system 1203 may use this information by attempting to identify people using the subset and then resorting to the remaining available information in the one or more external data sources if a person cannot be identified using the subset of available information. As this may allow less information to be evaluated for most queries, this may improve the speed and resources used when communicating with the external data sources to perform identification.

In numerous examples, various other solutions to the network 1202 being unavailable may be used. For example, the biometric ticketing system 1200 may interact with one or more of the person's devices (such as a mobile telephone or other mobile device) that may have a cellular or other network connection. In such an example, various devices of the biometric ticketing system 1200 (such as the point of entry device 1201, the identification system 1203, and so on) may communicate with the person's device or various applications executing thereon in order to use the network connection of the person's device to communicate with other devices. In this way, the biometric ticketing system 1200 may be able to operate even when the network 1202 is interrupted.

In various examples, the ticketing system 1204 may be a ticketing information database for the venue. In some implementations of such examples, the ticketing system 1204 and venue device 1220 may be incorporated into a single device. In other examples, the ticketing system 1204 may be one or more remote systems that maintain ticketing information for one or more venues.

As described above, an identifier for a person may be determined or otherwise obtained when the person is identified. The identifier may be used to obtain ticketing information for the person. The identifier may be associated with stored biometric data for the person in the identification system 1203 or other devices in a variety of different ways. For example, the person may provide his identifier to the identification system 1203. By way of another example, the person may provide information regarding an identification system account to the ticketing system 1204 and the ticketing system 1204 may then transmit the identifier to the identification system to link the accounts.

In still other examples, the person may be able to access an interface (such as one provided by the point of entry device 1201 or other device) that is operable to access an account within the ticketing system 1204 and/or an account in the identification system 1203. An interface operable to access an account within the ticketing system and/or the identification system 1203 may allow the person to edit their stored information, purchase or transfer tickets, validate tickets, buy additional services, link ticketing and identification system accounts (such as by using OAuth or similar technology to allow a person to log into his other account via a web site so that the web site is able to access a limited amount of information about the person's other account in order to link the two accounts), add or edit payment or other personal information, add biometric data, edit biometric data, and/or perform other functions. Various configurations are possible and contemplated without departing from the scope of the present disclosure.

In yet other examples, the point of entry device 1201 may be a device operated by the person, such as a mobile telephone or other mobile device. The person's device may execute one or more applications for communicating with other devices, such as a local or remote device forming part or all of the identification system 1203. In such an example, the point of entry device 1201 may be considered "point of entry" when it is located at the point of entry for a venue.

In some implementations, the person may provide a biometric to an application on his mobile telephone via a biometric reader such as a fingerprint sensor, camera, and/or 3D sensor. The application may transmit a digital representation of the biometric to the identification system 1203. The identification system 1203 may use the digital representation of the biometric to determine an identifier for the person, obtain ticketing information from the ticketing system 1204 using the identifier, and provide the ticketing information. For example, the identification system 1203 may determine that the person has a valid ticket for the venue, mark the ticket as having been used, and provide the application on the person's mobile telephone proof that the ticket has been used. The application may display this proof and the person may show the display to an agent or device at the venue for entrance. Various configurations are possible and contemplated without departing from the scope of the present disclosure.

Figure 14:
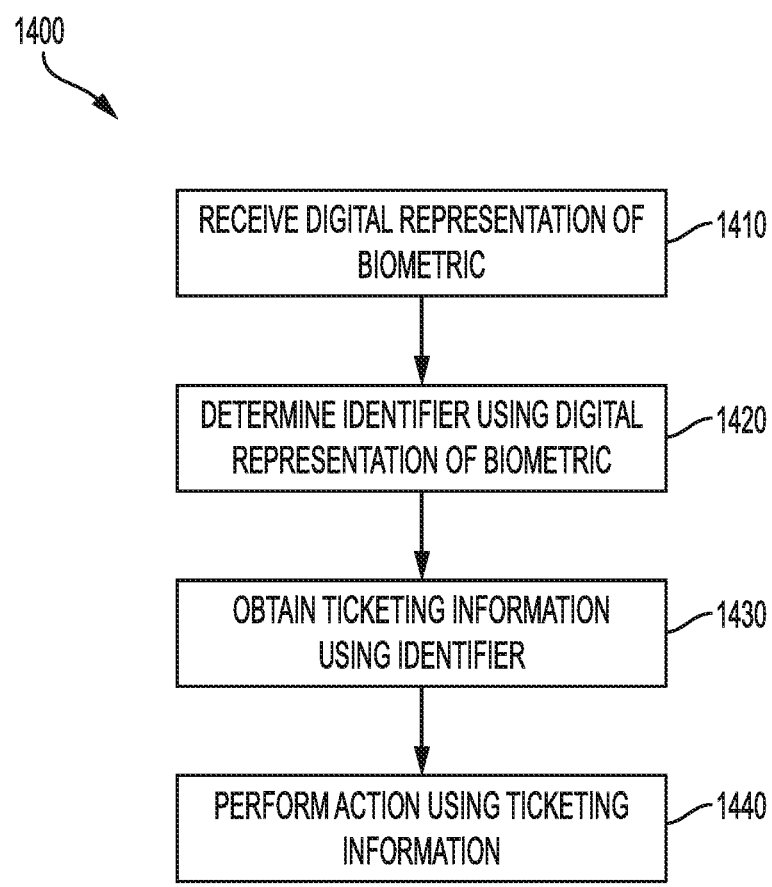
FIG. 14 depicts a flow chart illustrating a second example method for biometric ticketing. This method may be performed by the biometric ticketing system of FIG. 12.

FIG. 14 depicts a flow chart illustrating a second example method 1400 for biometric ticketing. This method 1400 may be performed by the biometric ticketing system 1200 of FIG. 12.

At 1410, a digital representation of a biometric may be received. At 1420, an identifier may be determined using the digital representation of the biometric. At 1430, ticketing information may be obtained using the identifier. At 1440, one or more actions may be performed using the ticketing information.

The action may be a variety of different actions. For example, the action may include determining whether or not the person has a ticket or other permissions to enter the venue, determining whether or not the person's ticket is valid, transferring the person's ticket to another person, purchasing a ticket for the person using stored payment information or a payment processing system, providing personalized services for the person and/or signaling one or more devices to do so, presenting a number of tickets associated with the person that the person can select among, allowing/denying entrance based on evaluated ticketing information, printing out a ticket stub or other proof of a used ticket (such as by the point of entry device 1201 of FIG. 12), transmitting a digital ticket stub or other proof of a used ticket to a person's device (such as by the point of entry device 1201 of FIG. 12 to a mobile telephone or other mobile device of the person), and so on. Various configurations are possible and contemplated without departing from the scope of the present disclosure.

In one example, a digital representation of a biometric may be received by an electronic device at a venue. The electronic device may transmit the digital representation of the biometric to an identification system. The identification system may provide an identifier in response. The identifier may be used to retrieve ticketing information associated with the identifier. In some implementations, ticketing information associated with the identifier may correspond to events at multiple venues and a subset of the ticketing information associated with the venue may be selected. For example, the venue or location of the venue may be specified in the request for the ticketing information. In other examples, geofencing or other techniques may be used. Various configurations are possible and contemplated without departing from the scope of the present disclosure.

In some implementations, the ticketing information may correspond to more than one ticket. In such implementations, one or more of the tickets may be selected.

For example, the ticketing information may correspond to multiple tickets and the multiple tickets may be selected among. For example, selection may be performed by prompting a person to select (such as from a list) and/or by using other selection mechanisms. In some examples, a person may be able to select multiple tickets to use for himself and one or more other people. In such examples, the person for whom a ticket is used may be tracked. In examples where a single ticket is ascertained, an express option (such as may be set in personal settings, defaults, or otherwise) may use the ascertained ticket without providing a list.

Although the example method 1400 is illustrated and described as including particular operations performed in a particular order, it is understood that this is an example. In various implementations, various orders of the same, similar, and/or different operations may be performed without departing from the scope of the present disclosure.

For example, 1430 is illustrated and described as obtaining ticketing information. In some examples, this may include transmitting the identifier to another device and receiving the ticketing information in return. In other examples, this may include retrieving ticketing information associated with the identifier from local storage. Various configurations are possible and contemplated without departing from the scope of the present disclosure.

In various examples, this example method 1400 may be implemented as a group of interrelated software modules or components that perform various functions discussed herein. These software modules or components may be executed by one or more computing devices, such as the point of entry device 1201 and/or the identification system 1203 of FIG. 12.

Figure 15:
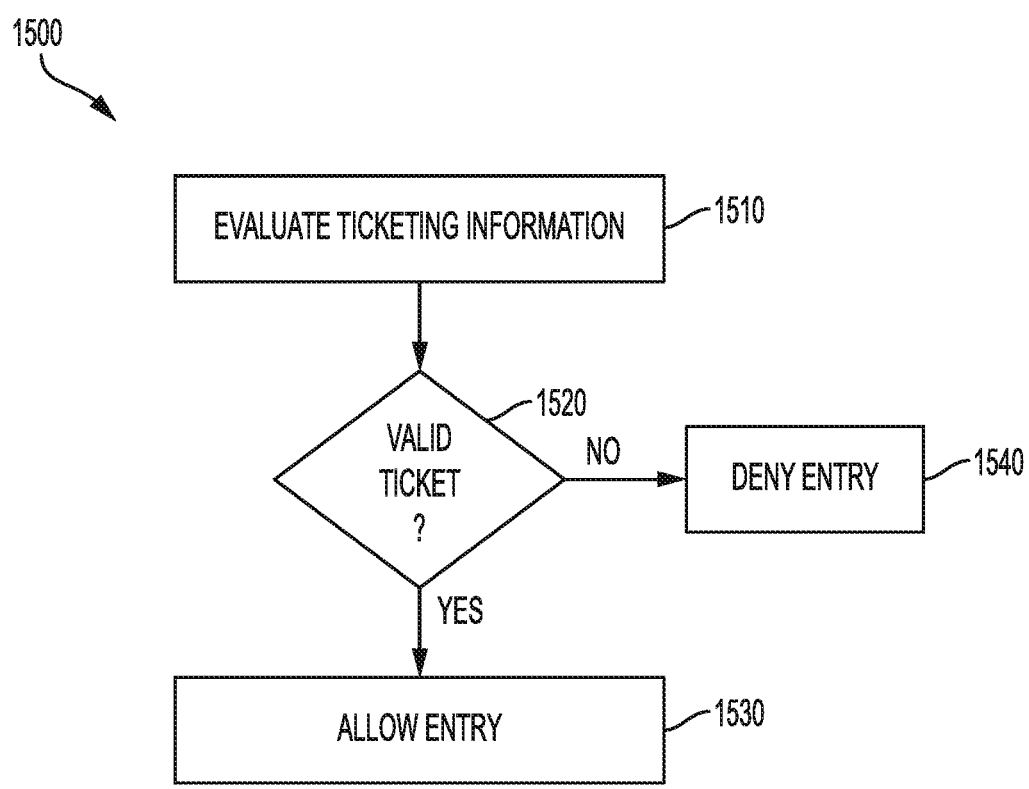
FIG. 15 depicts a flow chart illustrating a first example method for performing an action using ticketing information that may be used with the method of FIG. 14. This method may be performed by the biometric ticketing system of FIG. 12.

FIG. 15 depicts a flow chart illustrating a first example method 1500 for performing an action using ticketing information that may be used with the method 1400 of FIG. 14. This method 1500 may be performed by the biometric ticketing system 1200 of FIG. 12.

At 1510, ticketing information may be evaluated. At 1520, it may be determined whether or not the ticketing information includes a valid ticket. If so, the flow proceeds to 1530 where entry is allowed. Otherwise, the flow proceeds to 1540 where entry is denied.

Although the example method 1500 is illustrated and described as including particular operations performed in a particular order, it is understood that this is an example. In various implementations, various orders of the same, similar, and/or different operations may be performed without departing from the scope of the present disclosure.

For example, 1540 is illustrated and described as denying entry. However, it is understood that this is an example. In various implementations, a ticket may instead be purchased. For example, stored payment information may be used to purchase a ticket. In other examples, a payment processing system may be contacted in order to facilitate purchase of a ticket. Various configurations are possible and contemplated without departing from the scope of the present disclosure.

By way of another example, 1530 is illustrated and described as allowing entry. However, it is understood that this is an example. In various implementations, additional operations may be performed. For example, in numerous implementations, one or more of the functions described above with respect to the system 600 of FIG. 6 may also be performed. Various configurations are possible and contemplated without departing from the scope of the present disclosure.

In various examples, this example method 1500 may be implemented as a group of interrelated software modules or components that perform various functions discussed herein. These software modules or components may be executed by one or more computing devices, such as the point of entry device 1201 and/or the identification system 1203 of FIG. 12.

In various implementations, an identification system (such as the identification system 1203 of FIG. 12), a ticketing system (such as the ticketing system 1204 of FIG. 12), and/or other system may be accessible from an electronic device (such as the point of entry device 1201 of FIG. 12, any other computing device whether at a venue or located anywhere executing a web browser, app, or other application, and so on) to provide access to a ticketing "wallet." A ticketing wallet may be a list or other collection of tickets, ticketing information, or the like associated with a particular account. In some implementations, ticketing wallets may include other information. For example, a ticketing wallet may include a list of favorite venues, preferences for one or more venues (which may be used to assist in ticket purchase, seat selection, and so on), a "friend" or "buddy" list that may be used to identify people that a person knowns who may also attend events at a venue (which may be used to coordinate nearby seating, advise of attendance, extend invitations to join, and so on), and/or any other information that may be used with respect to ticketing information related to a person.

For example, a ticketing issuer may provide a person access to a ticketing wallet that includes all of the tickets the person has with that ticketing issuer. By way of another example, an identification system or other system may maintain and provide access to a ticketing wallet including the tickets, ticketing information, or the like associated with one or more people and one or more third party ticketing issuers.

Such a ticketing wallet may provide an interface or ticketing portal to interact with the information associated with the ticketing wallet in a variety of different ways. The interface may enable ticketing or other information to be presented or edited, tickets to be purchased or transferred, tickets to be used or validated, additional goods or services to be purchased, value added services to be purchased or otherwise obtained, new tickets to be purchased or otherwise obtained, various types of accounts to be linked, payment or personal information to be added or edited, biometric data to be added or edited, and so on.

Figure 16:
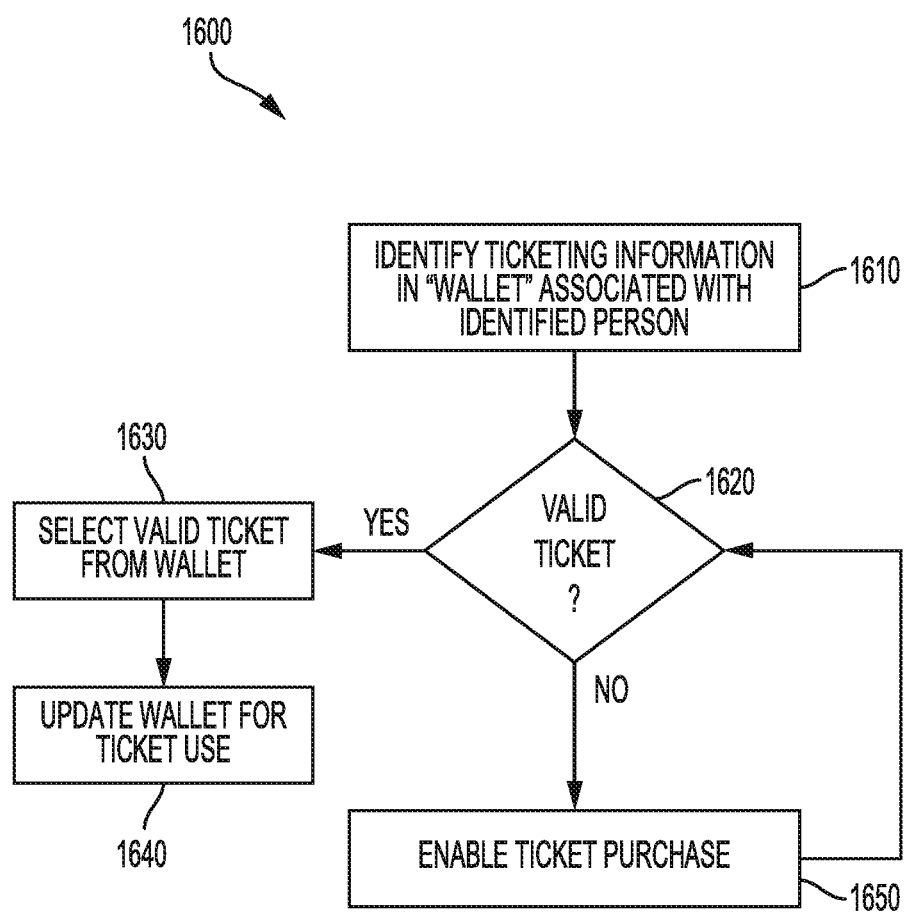
FIG. 16 depicts a flow chart illustrating a second example method for performing an action using ticketing information that may be used with the method of FIG. 14. This method may be performed by the biometric ticketing system of FIG. 12.

In various implementations, a ticketing wallet may also be accessible from a point of entry device at a venue, such as the point of entry device 1201 of FIG. 12. For example, FIG. 16 depicts a flow chart illustrating a second example method 1600 for performing an action using ticketing information that may be used with the method 1400 of FIG. 14. This method may be performed by the biometric ticketing system 1200 of FIG. 12.

At 1610, ticketing information associated with an identified person may be identified. At 1620, it may be determined whether or not the ticketing information includes at least one valid ticket. If so, the flow proceeds to 1630. Otherwise, the flow proceeds to 1650 where ticket purchase is enabled. Enabling of ticket purchase may include an offer to use stored payment information to purchase a ticket, redirection to a payment processing system for purchasing a ticket, and so on.

At 1630, after it is determined that the ticketing information includes at least one valid ticket, a valid ticket may be selected from the wallet. In some implementations, selection of a valid ticket from the wallet may include presentation of a list of one or more valid tickets and receiving a selection. In various implementations, presence of a single valid ticket in the wallet may trigger automatic selection of the single valid ticket.

At 1640, the wallet may be updated for ticket use. For example, a ticket may be removed from the wallet upon use.

Although the example method 1600 is illustrated and described as including particular operations performed in a particular order, it is understood that this is an example. In various implementations, various orders of the same, similar, and/or different operations may be performed without departing from the scope of the present disclosure.

For example, 1650 describes enabling a ticket purchase. In some implementations, the method 1600 may further include updating the wallet for ticket purchases. Various arrangements are possible and contemplated without departing from the scope of the present disclosure.

In various examples, this example method 1600 may be implemented as a group of interrelated software modules or components that perform various functions discussed herein. These software modules or components may be executed by one or more computing devices, such as the point of entry device 1201 and/or the identification system 1203 of FIG. 12.

In various implementations, a ticketing wallet may be accessed from a device at a venue, such as the point of entry device 1201 of FIG. 12. In other implementations, the ticketing wallet may be accessible from a variety of different applications executing on one or more of a variety of different devices that may not be associated with a venue. For example, a person may access a ticket wallet via an interface or ticketing portal executing on a personal computing device regardless where the personal computing device may be located.

Figure 17:
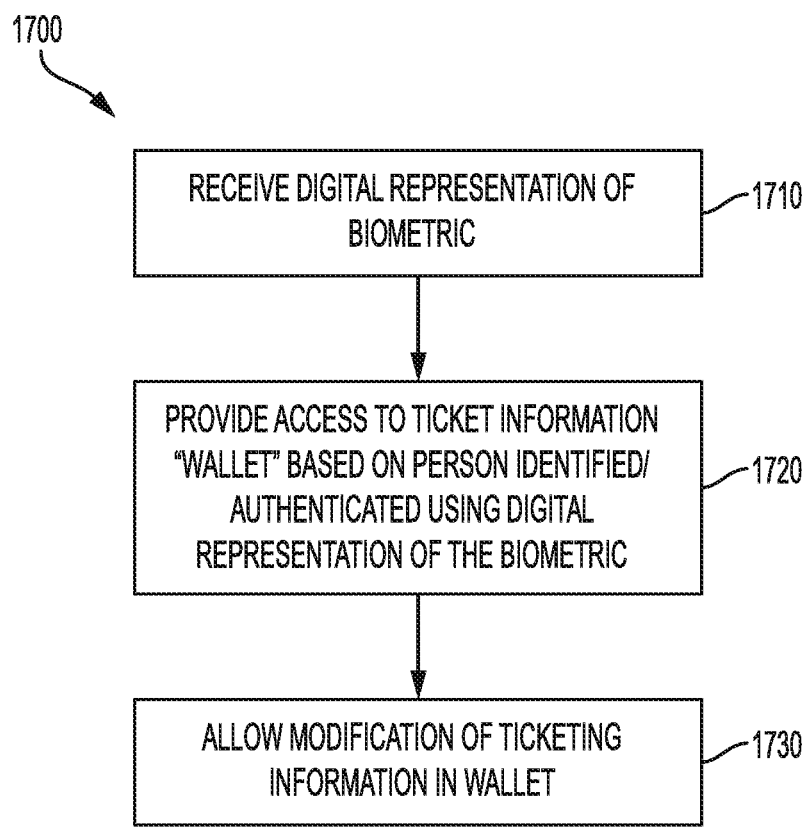
FIG. 17 depicts a flow chart illustrating a third example method for biometric ticketing. This method may be performed by the biometric ticketing system of FIG. 12.

For example, FIG. 17 depicts a flow chart illustrating a third example method 1700 for biometric ticketing. This method 1700 may be performed by the biometric ticketing system 1200 of FIG. 12.

At 1710, a digital representation of a biometric may be received. At 1720, access to a ticketing information wallet may be provided based on a person identified or authenticated using the digital representation of the biometric. The person may be identified using the digital representation of the biometric if the digital representation of the biometric is used to determine the identity of the person. The person may be authenticated using the digital representation of the biometric if the person specifies his identity and the digital representation of the biometric is used to verify that the person is who he asserts himself to be. At 1730, modification of ticketing information in the ticketing information wallet may be allowed.

Modification of the ticketing information in the ticketing information wallet may include editing ticketing or other information, purchasing or transferring tickets, using or validating tickets, purchasing or otherwise obtaining additional goods or services, purchasing or otherwise obtaining value added services, purchasing or otherwise obtaining new tickets, linking various types of accounts with the ticketing information wallet or an account associated therewith, adding or editing payment or personal information, adding or editing biometric data, and so on.

Although the example method 1700 is illustrated and described as including particular operations performed in a particular order, it is understood that this is an example. In various implementations, various orders of the same, similar, and/or different operations may be performed without departing from the scope of the present disclosure.

For example, the method 1700 is illustrated and described as using a digital representation of a biometric to identify and/or authenticate the person in order to provide access to the ticketing information wallet. However, it is understood that this is an example. In various implementations, other identification or authentication mechanisms may be used. For example, various logins, passwords, and/or other mechanisms may be used along with and/or instead of digital representations of biometrics without departing from the scope of the present disclosure.

In various examples, this example method 1700 may be implemented as a group of interrelated software modules or components that perform various functions discussed herein. These software modules or components may be executed by one or more computing devices, such as the point of entry device 1201 and/or the identification system 1203 of FIG. 12.

The above illustrates and describes a number of different embodiments. However, it is understood that these are examples. In various implementations, one or more features of one or more different embodiments and/or techniques discussed with respect to particular embodiments may be combined without departing from the scope of the present disclosure. Various configurations are possible and contemplated.

A number of the embodiments discussed above describe using a digital representation of a biometric (such as an image of a face, iris, retina, or other biometric; a hash or other encoded representation of a fingerprint or other biometric; and so on) to determine the identity of a person and obtain an identifier (such as an account number, a rewards program number, a frequent flyer number, a last name, a social security number, and/or any other identifier that may be used to identify the person) associated with that identity. As discussed herein, the digital representation of the biometric may not be included in the identifier. In other words, the identifier may be used to identify the person without including the digital representation of the biometric and/or other biometric data. For example, a hash of a fingerprint may be used to obtain an account number that numerically identifies the person but does not itself contain the hash of the fingerprint of a portion thereof. This may allow different systems to reliably and accurately identify a person and communicate that identity to other systems without sharing biometric data. This may allow systems using techniques disclosed herein to maintain privacy, avoid unnecessarily sharing private information, and so on.

However, it is understood that these are examples. In various implementations, identifiers may include portions and/or the entirety of the digital representation of the biometric without departing from the scope of the present disclosure. For example, some systems may use a hash of a fingerprint as an identifier for a person. By way of another example, an image of a person's face may be included in an identification token that also identifies the person using a numeric account code. Various configurations are possible and contemplated without departing from the scope of the present disclosure.

As described above and illustrated in the accompanying figures, the present disclosure relates to systems, methods, apparatuses, and computer program products for biometric ticketing, or physical token-less ticketing using biometrics. In some implementations, a person may be identified using a digital representation of a biometric. Ticketing information may be ascertained based on the identification. The ticketing information may be provided, actions may be performed using the ticketing information, and so on.

In various implementations, a person may provide biometric data to a checkpoint device as part of a ticketing system. A digital representation of the biometric data may be used to look up an identifier for the person from an identification system device. The digital representation of the biometric data may not be included in the identifier. The identifier may be used to obtain ticketing information from a ticketing system, which may be used to determine whether or not to allow the person entry into a ticketed area.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. An access control system, comprising:
   at least one non-transitory storage medium that stores instructions; and
   at least one processing unit that executes the instructions to:
   determine an external data store identifier for a person using a digital representation of a biometric;
   use the external data store identifier to determine whether authorization information for the person obtained from an external data store indicates that the person has authorization to enter, the digital representation of the biometric inaccessible to the external data store; and
   when the person has authorization, allow entry.

2. The access control system of claim 1, wherein the digital representation of the biometric comprises a digital representation of a fingerprint.

3. The access control system of claim 1, wherein the digital representation of the biometric comprises a digital representation of a retina.

4. The access control system of claim 1, wherein the digital representation of the biometric comprises a digital representation of an iris.

5. The access control system of claim 1, wherein the digital representation of the biometric comprises a digital representation of at least a portion of a face.

6. The access control system of claim 1, wherein the authorization information comprises boarding pass information.

7. The access control system of claim 1, wherein the authorization information comprises ticketing information.

8. An access control system, comprising:
   at least one non-transitory storage medium that stores instructions; and
   at least one processing unit that executes the instructions to:
   determine an authorization system identifier for a person using a digital representation of a biometric;
   use the authorization system identifier to access authorization information for the person obtained from an authorization system, the digital representation of the biometric inaccessible to the authorization system; and
   determine whether to allow the person to pass based on the authorization information.

9. The access control system of claim 8, wherein the at least one processing unit identifies the person using the digital representation of the biometric prior to determining whether to allow the person to pass.

10. The access control system of claim 8, wherein the at least one processing unit receives an indication that an identity of the person is verified using the digital representation of the biometric prior to determining whether to allow the person to pass.

11. The access control system of claim 8, wherein:
    the at least one processing unit uses the authorization system identifier to query a first database; and
    upon unsuccessfully querying the first database, the at least one processing unit uses the authorization system identifier to query a second database.

12. The access control system of claim 11, wherein the first database stores a subset of data stored by the second database.

13. The access control system of claim 8, wherein the at least one processing unit transmits a notification to an electronic device upon allowing the person to pass.

14. The access control system of claim 8, wherein the at least one processing unit transmits an offer to a mobile device of the person upon allowing the person to pass.

15. An access control system, comprising:
    at least one non-transitory storage medium that stores instructions; and
    at least one processing unit that executes the instructions to:
    determine an external system identifier for a person using a digital representation of a biometric;
    use the external system identifier to access pass information for the person obtained from an external system, the digital representation of the biometric inaccessible to the external system; and
    when the pass information for the person includes relevant pass information, indicate to allow the person to pass.

16. The access control system of claim 15, wherein the external system is a ticketing system.

17. The access control system of claim 15, wherein the external system comprises a pass issuer system.

18. The access control system of claim 15, wherein the external system comprises an airline system.

19. The access control system of claim 15, wherein the external system comprises a boarding pass system.

20. The access control system of claim 15, wherein the pass information is associated with a digital ticketing wallet that includes data related to multiple tickets.

* * * * *